(12) United States Patent
Cheon et al.

(10) Patent No.: US 9,185,316 B2
(45) Date of Patent: Nov. 10, 2015

(54) DATA SAMPLER, DATA SAMPLING METHOD, AND PHOTO DETECTING APPARATUS INCLUDING DATA SAMPLER THAT MINIMIZES THE EFFECT OF OFFSET

(75) Inventors: Jin Min Cheon, Yongin-si (KR); Dong Hun Lee, Yongin-si (KR); Young Kyun Jeong, Hwaseong-si (KR); Yun Jung Kim, Yongin-si (KR); Seog Heon Ham, Suwon-si (KR); Jin Ho Seo, Seoul (KR); Shuichi Shimokawa, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 878 days.

(21) Appl. No.: 13/307,374

(22) Filed: Nov. 30, 2011

(65) Prior Publication Data

US 2012/0138775 A1   Jun. 7, 2012

(30) Foreign Application Priority Data

Dec. 1, 2010   (KR) .................. 10-2010-0121106

(51) Int. Cl.
| | | |
|---|---|---|
| H01J 40/14 | (2006.01) | |
| H01L 27/00 | (2006.01) | |
| H03K 17/78 | (2006.01) | |
| H04N 5/361 | (2011.01) | |
| H04N 5/365 | (2011.01) | |
| H04N 5/378 | (2011.01) | |

(52) U.S. Cl.
CPC ............. *H04N 5/361* (2013.01); *H04N 5/3653* (2013.01); *H04N 5/378* (2013.01)

(58) Field of Classification Search
CPC ..... H04N 5/361; H04N 5/3653; H04N 5/378; H04N 5/37455; H03M 1/123; H03M 1/56
USPC ..... 250/214 R, 208.1, 214 DC, 214 C, 214.1; 348/243, 294, 241, 245, 302; 341/155, 341/164, 169, 158; 327/310, 514, 515
See application file for complete search history.

(56) References Cited

U.S. PATENT DOCUMENTS

| | | | |
|---|---|---|---|
| 6,791,607 B1 * | 9/2004 | Bilhan et al. | 348/243 |
| 7,084,912 B2 * | 8/2006 | Chieh | 348/245 |
| 8,405,747 B2 * | 3/2013 | Mo et al. | 348/245 |
| 2003/0202111 A1 * | 10/2003 | Park | 348/243 |
| 2005/0206548 A1 * | 9/2005 | Muramatsu et al. | 341/172 |
| 2008/0239111 A1 * | 10/2008 | Jiang | 348/243 |

FOREIGN PATENT DOCUMENTS

| | | |
|---|---|---|
| JP | 08-077340 | 3/1996 |
| JP | 2006-033452 | 2/2006 |
| KR | 2003-0085457 A | 11/2003 |

* cited by examiner

*Primary Examiner* — Que T Le
*Assistant Examiner* — Jennifer Bennett
(74) *Attorney, Agent, or Firm* — Volentine & Whitt, PLLC

(57) ABSTRACT

A data sampler and a photo detecting apparatus compensate a reference signal with offset information measured from a unit pixel, and compare an offset-compensated reference signal with a data signal, thereby minimizing the impact of an offset occurring with an increase of gain in the data sampler.

15 Claims, 29 Drawing Sheets

FIG. 8

| | | Top Frame OB Pixel Array for Ramp Offset 87a | | |
|---|---|---|---|---|
| | | Top Frame OB Pixel Array 86a | | |
| Line OB Pixel Array (w/o PD) | Line OB Pixel Array (w/ PD) | Active Pixel Array 82 | Line OB Pixel Array (w/ PD) 83 | Line OB Pixel Array (w/o PD) 84 |
| | | Auto Exposure Pixel Array 85 | | |
| | | Bottom Frame OB Pixel Array 86b | | |
| | | Bottom Frame OB Pixel Array for Ramp Offset 87b | | |

DATA SAMPLER, DATA SAMPLING METHOD, AND PHOTO DETECTING APPARATUS INCLUDING DATA SAMPLER THAT MINIMIZES THE EFFECT OF OFFSET

CROSS-REFERENCE TO RELATED APPLICATIONS

This application claims priority under 35 U.S.C. §119(a) from Korean Patent Application No. 10-2010-0121106 filed on Dec. 1, 2010, the disclosure of which is hereby incorporated by reference in its entirety.

BACKGROUND

The present invention relates to a data sampler, a data sampling method, and a photo detecting apparatus including the data sampler. In particular, the present invention relates to a method of compensating for an offset of sensor data from a sensor cell, such as a photodetector cell of a photo detecting apparatus, and more particularly, to a data sampler, a data sampling method and a photo detecting apparatus which can compensate a reference signal employed in the data sampler with the offset.

In a sensor apparatus including a sensor cell array which senses an effective physical characteristic, such as light intensity, temperature, mass, or time, and which outputs an electrical signal, there may be an offset between sensor cells due to differences in environmental conditions, such as a manufacturing process, operating voltage, temperature, etc. Due to such an offset, the sensor apparatus may not perform precise sensing. In particular, when a signal output from a sensor cell is so weak that it needs to be amplified, or when signal sensing or integration takes a long time, the effect of the offset increases.

SUMMARY

Some embodiments of the present invention provide a data sampler, and a data sampling method, which may overcome one or more conventional problems. Some embodiments of the present invention provide a data sampler for minimizing the effect of an offset at low luminance, and a photo detecting apparatus including the same. Some embodiments of the present invention provide a photo detecting apparatus for minimizing the effect of an offset by subtracting the offset from a reference signal used in the data sampling operation.

According to one aspect of the present invention, there is provided a device including an active sensor array comprising a plurality of sensor cells arranged in rows and columns, each of the sensor cells being configured to sense an environmental characteristic; at least one block of cells not belonging to the active sensor array; and a data sampler for sampling an output of the active sensor array. The data sampler includes at least one analog-to-digital converter (ADC) configured to receive the output of the active sensor array and to generate therefrom a sampled output that is compensated for an offset determined from an output of the at least one block of cells not belonging to the active sensor array. The environmental characteristic that is sensed by the sensor cells may include a light intensity, an intensity of light having a certain color, a sound level, a temperature, a mass, or a measure of time.

In some embodiments, the device includes an offset-compensated reference voltage generator configured to generate an offset-compensated reference voltage based on the determined offset. In some embodiments, the offset-compensated reference voltage generator includes a ramp voltage generator configured to generate a ramp voltage, and the offset-compensated reference voltage generator is configured to offset the ramp voltage by the offset.

In some embodiments, the at least one ADC includes: at least one comparator configured to compare the output of the active sensor array with the offset-compensated reference voltage; and at least one counter configured to output a digital count value for which the output of the active sensor array matches the offset-compensated reference voltage. In some versions of these embodiments, the device includes a multiplexer for multiplexing output signals from the columns of the active sensor array to generate the output, wherein an output of the multiplexer is supplied to the comparator. In other versions of these embodiments, the least one comparator includes a plurality of comparators each connected to receive a corresponding output signal of a corresponding one of the columns of the active sensor array, and wherein each of the comparators also receives the offset-compensated reference voltage and compares the corresponding output signal of the corresponding one of the columns of the active sensor array with the offset-compensated reference voltage.

According to another aspect of the present invention, there is provided a device that includes: an offset-compensated reference signal generator and a comparator. The offset-compensated reference signal generator is configured: to receive a first signal including offset information, to compensate a reference signal with the offset information, and to generate an offset-compensated reference signal. The comparator is configured to receive a second signal including data, and to compare the offset-compensated reference signal with the second signal.

In some embodiments, the first signal and the second signal are respectively output from a first pixel and a second pixel of a pixel array, which have a same structure as each other, wherein the first signal comprises an output in a state where the first pixel does not have an input, and wherein the second signal comprises an output in a state where the second pixel does have an input. In some embodiments, an output is generated with respect to the first signal, then the offset-compensated reference signal is generated based on the first signal, and then the offset-compensated reference signal is compared with the second signal. In some embodiments, the device includes a counter configured to count an output of the comparator and output a digital signal.

According to yet another aspect of the present invention, there is provided an apparatus that includes a pixel array. The pixel array includes: an active pixel which outputs a photo sensing signal, and a dark pixel which outputs a dark offset signal for offset compensation of a reference signal. The apparatus also includes: an offset-compensated reference signal generator configured to compensate the reference signal with an offset based on the dark offset signal, and to generate an offset-compensated reference signal; and a comparator configured to compare the offset-compensated reference signal with the photo sensing signal.

In some embodiments the apparatus further includes a counter configured to count an output of the comparator and output a digital signal.

In yet other embodiments, a method of compensating for an offset of a photo detecting apparatus is provided. The method includes outputting a first dark offset signal including offset information; generating an offset-compensated reference signal by compensating a reference signal with the offset information based on the first dark offset signal; outputting a photo sensing signal and a second dark offset signal; outputting a first data signal by comparing the offset-compensated reference signal with the photo sensing signal, and counting a result of the comparison of the offset-compensated reference signal with the photo sensing signal; outputting a second signal by comparing the offset-compensated reference signal with the second dark offset signal; and compensating for an offset of the first data signal based on the second data signal corresponding to the second dark offset signal.

BRIEF DESCRIPTION OF THE DRAWINGS

The above and other features and advantages of the present invention will become more apparent by describing in detail exemplary embodiments thereof with reference to the attached drawings in which:

FIG. 8 is a diagram of a cell array according to some embodiments of the present invention;

DETAILED DESCRIPTION OF THE EMBODIMENTS

Figure 1:
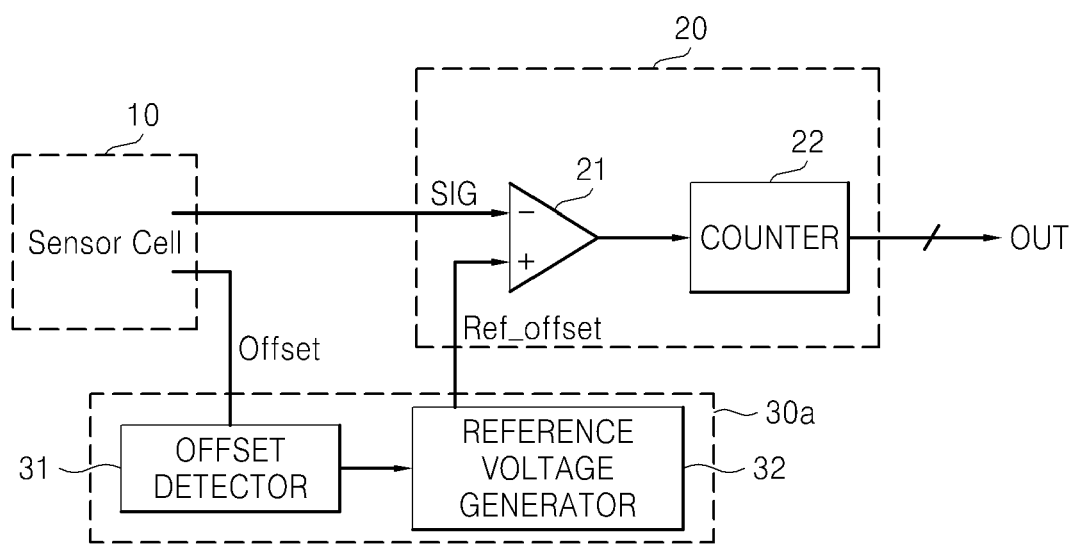
FIG. 1 is a block diagram of a sensor apparatus including a data sampler according to some embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a sensor apparatus including a data sampler according to some embodiments of the present invention. Referring to FIG. 1, the sensor apparatus (or device) includes a sensor cell 10 and the data sampler. The data sampler includes an offset-compensated reference voltage generator 30a and an analog-to-digital converter (ADC) 20.

Sensor cell 10 may output as a cell output voltage SIG a reset voltage corresponding to an initial value and/or a data voltage corresponding to a data value. For instance, sensor cell 10 of the sensor apparatus may sense an environmental characteristic such as a light intensity, an amount of light having a particular color, a sound level, a temperature, a mass, or a measure of time, and outputs an electrical signal corresponding to the sensed environmental characteristic. Apart from sensor cell 10 generating the reset voltage and the data voltage, the sensor apparatus or sensor cell 10 may include an offset detection (or generation) cell outputting offset value Offset for offset compensation.

For instance, in case of a photo detecting apparatus, the offset values may include offset values provided from unit cells belonging to a frame optical black region (hereinafter referred to as an F-OB), a line optical black region (hereinafter referred to as an L-OB), an auto exposure optical black region (hereinafter referred to as an AE-OB), and a reference voltage optical black region (hereinafter referred to as an R-OB). For Instance, the offset detection (or generation) cell included in sensor cell 10 may be the R-OB.

For instance, the F-OB is for compensating for an offset between sensor cells in a frame and the L-OB is for compensating for an offset between lines, i.e., columns. The R-OB is for the compensation of a reference voltage based on an offset due to a difference between sensor cells. The offset values may substantially be similar to one another. The L-OB may have a structure which does not include a photo sensitive device, e.g., a photodiode, therewithin.

Offset-compensated reference voltage generator 30a includes an offset detector 31 and a reference voltage generator 32. Offset detector 31 detects an offset value Offset provided from the sensor cell 10, for example, the R-OB, and controls reference voltage generator 32 based on a detection result, so that reference voltage generator 32 generates an offset-compensated reference voltage Ref_offset.

Here, reference voltage generator 32 may actively compensate the reference voltage based on the offset value detected by offset detector 31. Alternatively, the result of offset detector 31 may be provided to any controller and reference voltage generator 32 may be controlled by the controller.

The data sampler shown as an example in FIG. 1 includes offset-compensated reference voltage generator 30a and ADC 20, but the data sampler may include offset-compensated reference voltage generator 30a and any circuit which compares offset-compensated reference voltage Ref_offset from offset-compensated reference voltage generator 30a with the data voltage from sensor cell 10.

ADC 20 includes a comparator 21 and a counter 22. Comparator 21 receives the data voltage SIG from sensor cell 10 and receives the offset-compensated reference voltage Ref_offset from offset-compensated reference voltage generator 30a.

The sensor apparatus may include a plurality of sensor cells 10 arranged in an active sensor array of columns and rows in a matrix form. In this case, in some embodiments a separate ADC 20 may be provided for each of the columns in the active sensor array and the plurality of ADCs 20 may share the offset-compensated reference voltage Ref_offset output from offset-compensated reference voltage generator 30a with one another.

Alternatively, in other embodiments a separate comparator 21 may be provided for each of the columns and a single counter 22 may be shared among the comparators 21 for all of the columns. In this case, ADC 20 may include a latch (not shown) provided for each column and the latch may store a count signal output from shared counter 22. For instance, an ADC 20 provided for each column may include only a first latch (not shown) storing a count signal corresponding to the data voltage SIG or may include the first latch and a second latch (not shown) storing a count signal corresponding to the offset-compensated reference voltage Ref_offset.

Comparator 21 compares the data voltage SIG from sensor cell 10 with the offset-compensated reference voltage Ref_offset and provides a comparison result to counter 22. For instance, when the offset-compensated reference voltage Ref_offset is a ramp voltage having a ramp slope, counter 22 counts an amount of time, or the number of cycles or periods of a clock, until the offset-compensated reference voltage Ref_offset reaches the data voltage SIG, and outputs a digital output signal OUT based on a counting result.

To compensate for an offset due to a difference between sensor cells 10, for example, a photo detecting apparatus may employ a correlated double sampling (CDS) scheme. In the CDS scheme, a reset voltage and then a data voltage are read from sensor cells 10 and a difference between the two voltages is calculated.

When CDS is performed in an analog domain, it is referred to as analog CDS. In the embodiments illustrated in FIG. 1, a circuit for the CDS may be provided between sensor cell 10 and comparator 21. For example, a switch and a capacitor may be provided at an input terminal of comparator 21 to perform the CDS.

Alternatively, CDS may be performed in a digital domain. In this case, a reset voltage and a sensed voltage, i.e., a data voltage may be converted by ADC 20 and a difference between the reset voltage and the sense voltage may be digitally calculated. Alternatively, dual CDS may be performed in both analog and digital domains.

Figure 2:
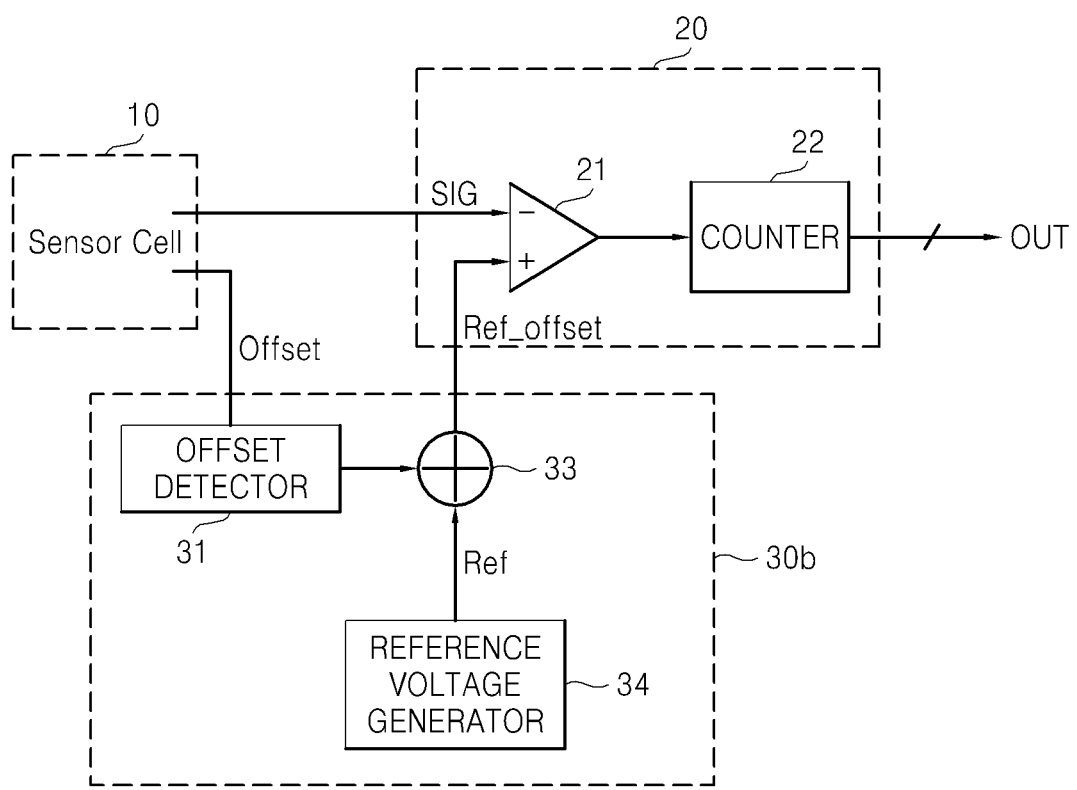
FIG. 2 is a block diagram of a sensor apparatus including a data sampler according to other embodiments of the present invention.

FIG. 2 is a block diagram of a sensor apparatus including a data sampler according to other embodiments of the present invention. Since like numbers refer to like elements in FIGS. 1 and 2, detailed descriptions thereof will be omitted.

Referring to FIG. 2, an offset-compensated reference voltage generator 30b includes offset detector 31, an adder 33, and a reference voltage generator 34. Adder 33 adds a detected offset value provided from offset detector 31 to a reference voltage Ref provided from reference voltage generator 34 and outputs an offset-compensated reference voltage Ref_offset. At this time, the adding may be performed on analog signals or the reference voltage Ref may be controlled digitally.

Figure 3:
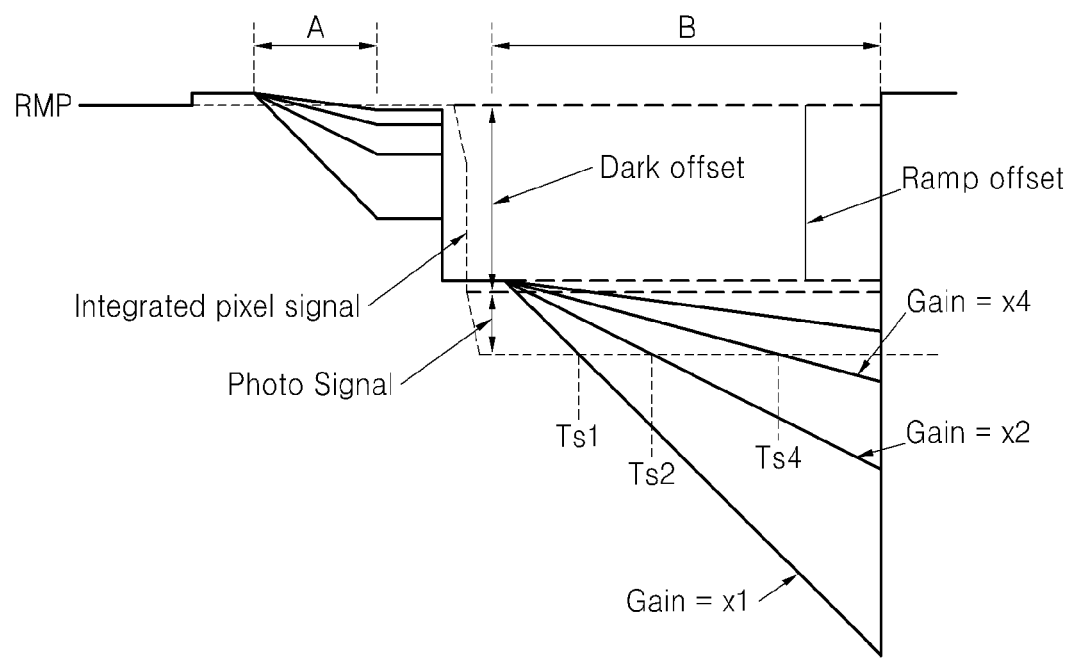
FIG. 3 is a timing diagram for explaining an example analog-to-digital conversion (ADC) operation in a photo detecting apparatus, e.g., a complementary metal-oxide-semiconductor (CMOS) image sensor, using reference voltage compensation.

FIG. 3 is a timing diagram for explaining an example analog-to-digital conversion (ADC) operation in a photo detecting apparatus, e.g., a complementary metal-oxide-semiconductor (CMOS) image sensor including a plurality of pixel cells, using reference voltage compensation or offset-compensated reference voltage. The ADC operation will be described with reference to FIGS. 1 through 3.

The ADC operation illustrated in FIG. 3 is single slope ADC operation using dual CDS, in which CDS is performed in both analog and digital domains and a single-slope ramp signal is used as a reference voltage.

A reference character "A" denotes a period in which a reset voltage is received from a pixel cell, e.g., sensor cell 10 and analog-to-digital conversion is performed on a column offset. A reference character "B" denotes a period in which a sensed voltage is received from the pixel cell, e.g., sensor cell 10 CDS is performed on the reset voltage and the sense voltage in the analog domain, and analog-to-digital conversion is performed on a CDS result. It is seen in FIG. 3 that an offset-compensated ramp voltage RMP used as the reference voltage has a slope which starts from a level at which a reference voltage offset Ramp offset detected in the period B is compensated for. The above-described operation will be described in detail below. Here, a CDS circuit (not shown) including a capacitor for analog CDS may be provided between comparator 21 and sensor cell 10 illustrated in FIGS. 1 and 2.

A reference voltage offset value is detected to obtain the offset-compensated ramp voltage RMP. For instance, an output voltage is sensed from an R-OB near an active pixel array in a dark state and analog-to-digital conversion is performed using the output voltage as analog gain of 1 Gain=x1. At this time, in case of an F-OB, an offset may exist in each pixel, and therefore, values may be obtained with respect to a plurality of R-OBs and an average of the values may be taken.

Thereafter, a reset voltage is sensed from a pixel cell and is subjected to analog-to-digital conversion using a ramp signal. An analog-to-digital conversion result is stored in a separate memory, latch or buffer. The reset voltage is stored in the capacitor included in the CDS circuit. An amplifier (or a modification of comparator 21 shown in FIGS. 1 and 2) for CDS does not generate an output with respect to a reset voltage received through an input terminal using auto-zeroing. Accordingly, an output includes a column offset existing in each column.

Thereafter, a sensed voltage is output from the pixel cell and a difference between the sensed voltage and the reset voltage stored before through a switching operation is stored in the capacitor. In other words, CDS is performed. A CDS result or a CDS output is compared with the offset-compensated ramp voltage RMP during the period B. A point where the offset-compensated ramp voltage RMP meets the CDS output, i.e., a photo signal is found. Counter 22 counts cycles or periods of a clock, until the offset-compensated reference voltage Ref_offset reaches the data voltage SIG, and outputs a digital value corresponding to a count result. A digital CDS value also includes the offset of each column. Accordingly, a value stored in the period A and a value output in the period B are subjected to subtraction, i.e., CDS in the digital domain, so that a digital CDS result from which the offset of each column is eliminated is obtained.

When the reference voltage offset ("Ramp offset" is in FIG. 3) not compensated for with respect to a reference voltage and the gain of comparator 21 is set not to Gain=x1 but instead to Gain=x2 or more because of a dark offset ("Dark offset" in FIG. 3) whose value is substantially the same as the reference voltage, an effective signal output from a pixel cell is not sensed due to the dark offset.

However, as described above, when the reference voltage offset is compensated for with respect to the reference voltage in the period B, an effective signal from a pixel cell is sensed even when the gain of comparator 21 is set to Gain=x4.

The effect of the dark offset may be significant in a bulb mode supported in a digital still camera or a digital single-lens reflex (DSLR) camera. The bulb mode allows a user to open a shutter for a wanted period of time to provide a long exposure. The bulb mode may be used to shoot images at low luminance, and stars in the sky and traces of car headlights, which change over time.

Figure 4A:
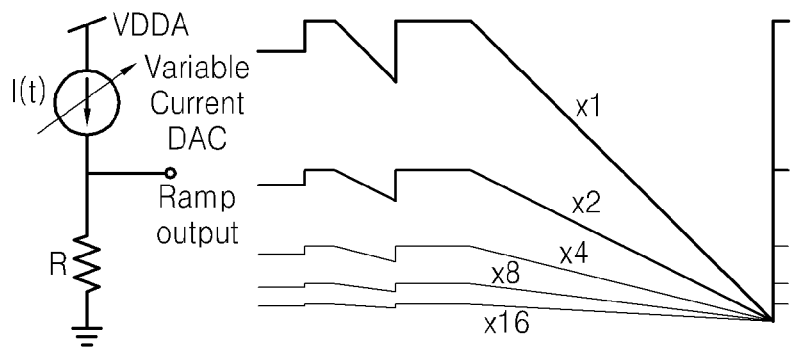
FIGS. 4A through 4C are schematic diagrams of examples of a ramp generator.
Figure 4B:
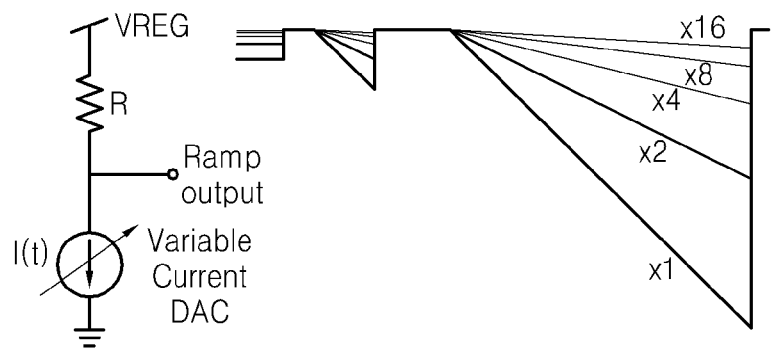
Figure 4C:
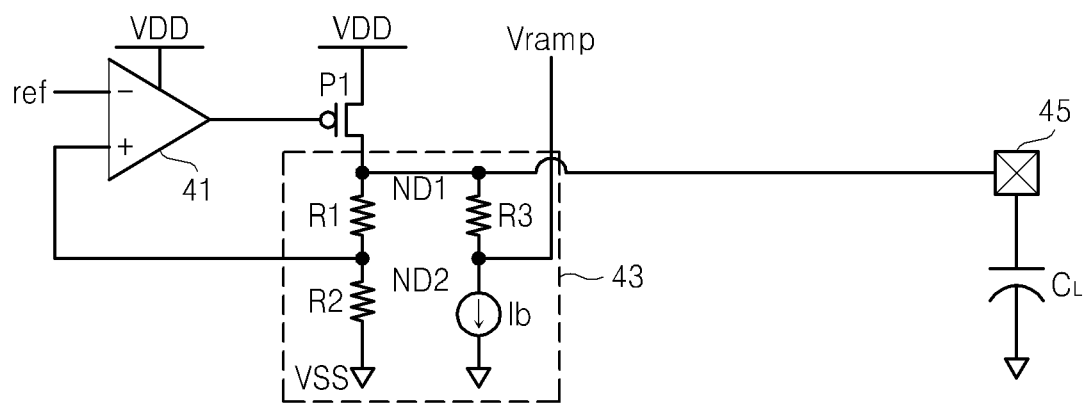

FIGS. 4A through 4C are schematic diagrams of examples of a ramp generator for generating a ramp signal. Since a ramp signal is exemplified as a reference voltage in FIG. 3, a P-type metal-oxide-semiconductor (PMOS) reference voltage generator and an N-type metal-oxide-semiconductor NMOS reference voltage generator are illustrated in FIGS. 4A through 4C.

A ramp generator may use a phenomenon in which a voltage level of a ramp output changes as current is changed by a current-steering digital-to-analog converter (DAC).

FIG. 4A shows a PMOS ramp signal generator and FIG. 4B shows an NMOS ramp generator. FIG. 4C is a detailed circuit diagram of the PMOS ramp generator. Referring to FIG. 4C, the PMOS ramp generator includes a voltage-to-current (V-I) converter 43, a comparator 41, a switching PMOS transistor P1, and a pad 45 connected to an external capacitor $C_L$. The ramp generator periodically generates a ramp signal Vramp based on a reference signal ref.

The voltage-to-current (V-I) converter 43 includes a divider connected between an output node ND1 and a ground voltage VSS, and a current source Ib. The divider includes a first resistor R1 connected between the output node ND1 and a first node ND2 and a second resistor R2 connected between the first node ND2 and the ground VSS. The divider divides a voltage of the output node ND1 and the first node ND2 outputs a divided voltage as a feedback signal. The divided voltage is determined based on the resistance of the first and second resistors R1 and R2 and is provided to a non-inverting input terminal (+) of comparator 41.

The current source Ib is connected to the output node ND1 through a third resistor R3 and outputs the ramp signal Vramp based on the voltage of the output node ND1. Comparator 41 compares the reference signal ref input through an inverting input terminal (−) with the feedback signal input through the non-inverting input terminal (+) and in response thereto outputs a comparison result. The switching PMOS transistor or switching element P1 is connected between a power line VDD supplying voltage and the output node ND1 and is turned on according to the comparison result output from comparator 41 to form a current path between the power line and the ground VSS.

In the PMOS ramp generator illustrated in FIG. 4A, the switching element P1 is implemented by an PMOS transistor In the NMOS ramp generator illustrated in FIG. 4B, the switching element P1 is implemented by an NMOS transistor. For instance, when the switching element P1 is a PMOS transistor, it may be turned on in response to the comparison result having logic low level. When the switching element P1 is an NMOS transistor, it may be turned on in response to the comparison result having a logic high level. Here, ×1, ×2, ×4, ×8, or ×16 means a gain of comparator 41.

Figure 5A:
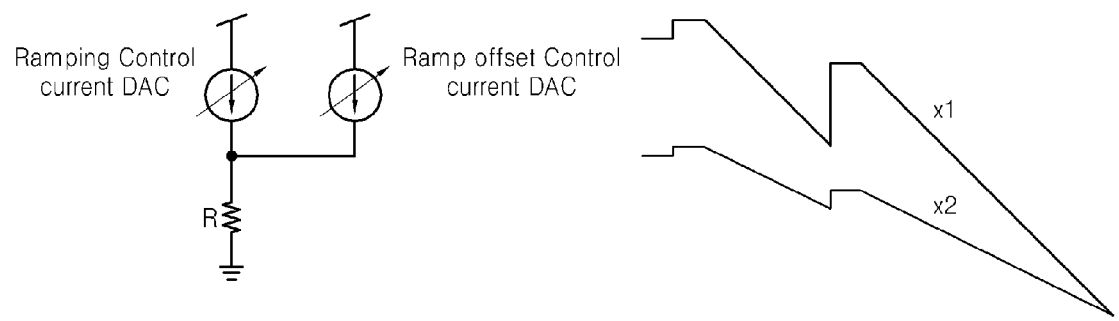
FIGS. 5A and 5B are schematic diagrams of ramp generators according to some embodiments of the present invention.
Figure 5B:
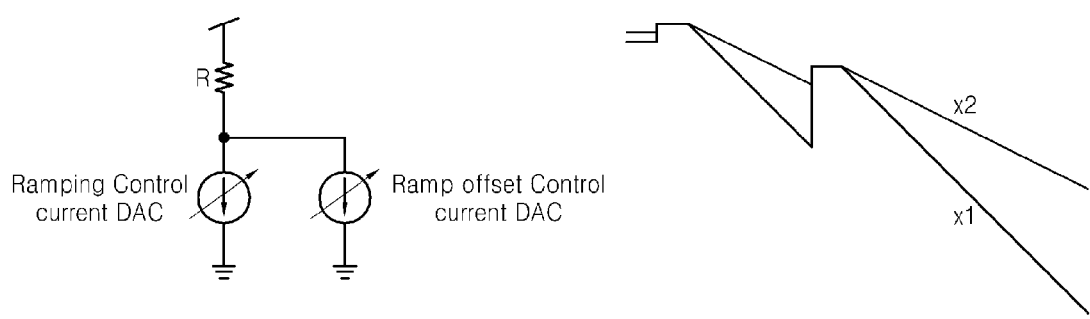

FIGS. 5A and 5B are schematic diagrams of ramp generators according to some embodiments of the present invention. FIG. 5A shows a PMOS ramp generator and FIG. 5B shows an NMOS ramp generator. Here, the ramp generator corresponds to reference voltage generator 32 illustrated in FIG. 1 or a combination of reference voltage generator 34 and adder 33 illustrated in FIG. 2. In other embodiments, instead of the structure shown in FIG. 5A or 5B, the ramp generator may be implemented by a structure in which the output signal of offset detector 31 is added to the reference signal ref (see FIG. 4C) as a control signal.

FIGS. 4A through 5B show examples using a PMOS or an NMOS transistor as a switching element. Since the slope of the ramp signal is more important than the voltage level of the ramp signal, any type of transistor may be used as a switching element.

Figure 6:
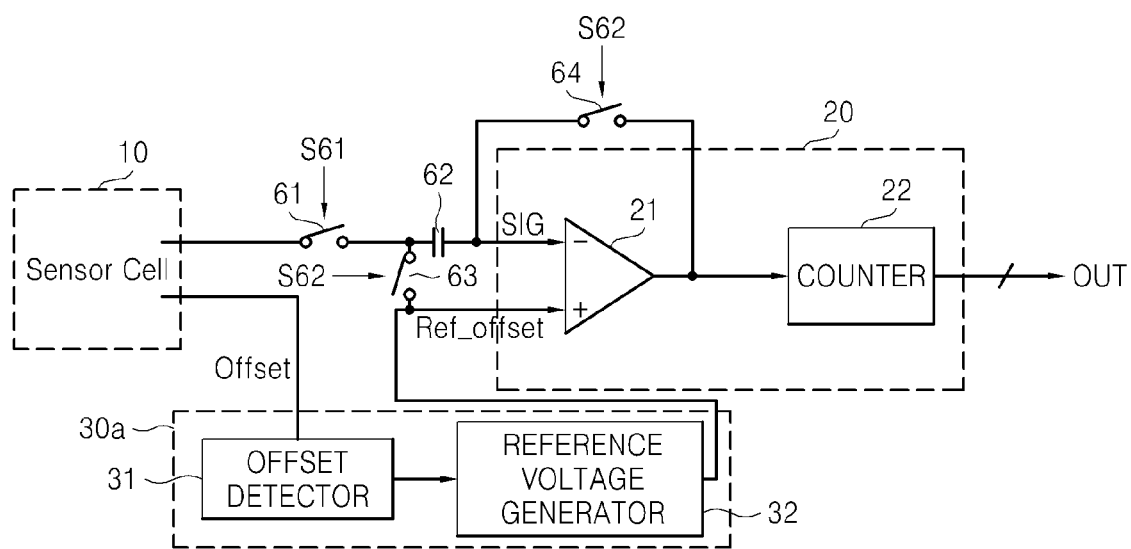
FIG. 6 is a block diagram of a sensor apparatus including a data sampler according to further embodiments of the present invention.

FIG. 6 is a block diagram of a sensor apparatus including a data sampler according to further embodiments of the present invention. The sensor apparatus illustrated in FIG. 6 further includes switches 61, 63 and 64 and a capacitor 62 in addition to the structure shown in FIG. 1. Since like numbers refer to like elements in FIGS. 1 and 6, detailed descriptions thereof will be omitted.

While a first switching signal S61 and a second switching signal S62 are each at a high logic level, thereby closing switches 61 and 63, comparator 21 receives the offset-compensated reference voltage Ref_offset from offset-compensated reference voltage generator 30a and compares the offset-compensated reference voltage Ref_offset with a result of performing CDS on the output signal of sensor cell 10 using capacitor 62. ADC 20 includes comparator 21 and counter 22 counting an output of comparator 21 and outputs a digital signal OUT.

The sampling operations will be described in detail with reference to FIG. 6 below.

While second switching signal S62 is at the logic high level, comparator 21 receives the offset-compensated reference voltage Ref_offset and capacitor 62 stores a charge corresponding to an offset of comparator 21. Such operation may be performed before or after sensor cell 10 outputs a reset voltage.

While sensor cell 10 outputs the reset voltage as an output voltage, first switching signal S61 is at the logic high level for a predetermined period of time. While first switching signal S61 is at the logic high level, thereby closing switch 61, capacitor 62 may store a charge corresponding to a voltage difference between the offset of comparator 21 and the reset voltage. According to some embodiments, after capacitor 62 stores the charge corresponding to the voltage difference, first switching signal S61 goes to a logic low level, thereby opening switch 61, while second switching signal S62 is at the logic high level, thereby closing switch 63, and comparator 21 receives the offset-compensated reference voltage Ref_offset.

In addition, comparator 21 does not provide a voltage corresponding to the charge stored in capacitor 62 to comparator 21 using auto-zeroing. Accordingly, comparator 21 performs analog-to-digital conversion on a component corresponding to an offset.

While a data voltage is output from sensor cell 10, first switching signal S61 is at the logic high level, thereby closing switch 61, and comparator 21 receives the offset-compensated reference voltage Ref_offset. Comparator 21 also receives through an inverting input terminal (−) an effective signal voltage SIG corresponding to a result of CDS performed by capacitor 62, that is, a result of analog calculation based on a difference between the reset voltage and the data voltage and the offset. Thereafter, analog-to-digital conversion is performed on the effective signal voltage SIG.

Subtraction of output values obtained through the above-described two times of analog-to-digital conversion is performed in the digital domain, and therefore, the offset of comparator 21 is cancelled. This operation is referred to as a single slope analog-to-digital conversion using dual CDS.

In addition, a result of performing offset compensation on a reference voltage is reflected to the comparison of the effective signal voltage SIG and the analog-to-digital conversion. In other words, a signal output from an offset detection cell located at sensor cell 10 is detected as an offset by offset detector 31 and an output of offset detector 31 is reflected to the CDS on the effective signal voltage SIG. Accordingly, even when the gain of comparator 21 is increased (that is, the slope of the reference voltage is decreased), since the offset is reflected to the reference voltage, a wanted signal voltage is obtained regardless of the offset.

Figure 7:
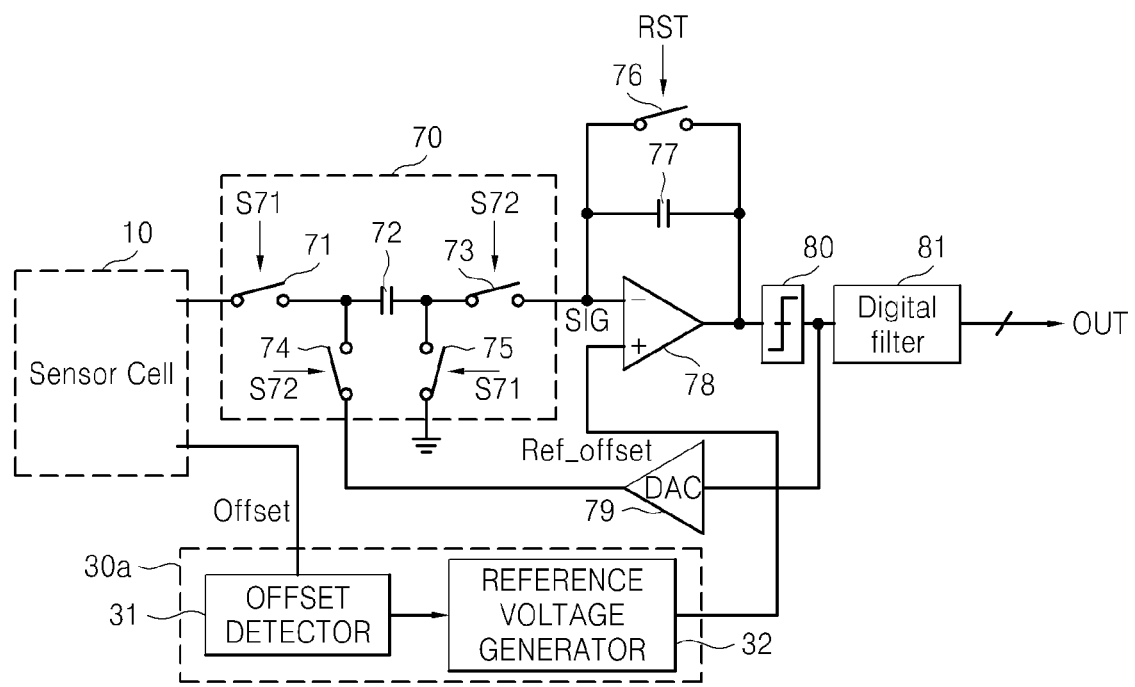
FIG. 7 is a block diagram of a sensor apparatus including a data sampler according to other embodiments of the present invention.

FIG. 7 is a block diagram of a sensor apparatus including a data sampler according to other embodiments of the present invention. The sensor apparatus illustrated in FIG. 7 further includes switches 71, 73, 74, 75, and 76 and capacitors 72 and 77 in addition to the structure shown in FIG. 1. Since like numbers refer to like elements in FIGS. 1 and 7, detailed descriptions thereof will be omitted.

An ADC includes an integrator, a quantizer 80, a DAC 79, and a digital filter 81.

The ADC shifts quantization noise to a high frequency using oversampling and/or noise shaping during analog-to-digital conversion, thereby minimizing noise.

The integrator integrates a difference between an output voltage of sensor cell 10 and an output signal of DAC 79. The integrator includes a comparator or amplifier 78, first capacitor 77, reset switch 76, and a switched capacitor arrangement 70. Comparator 78 includes an inverting input terminal (−) receiving a difference between the output voltage of sensor cell 10 and the output signal of DAC 79 and a non-inverting input terminal (+) receiving the offset-compensated reference voltage Ref_offset.

First capacitor 77 and reset switch 76 are connected in parallel between the inverting input terminal (−) of comparator 78 and an output terminal thereof. First capacitor 77 stores a charge based on a difference between the output voltage of sensor cell 10 and the output signal of DAC 79. Reset switch 76 discharges first capacitor 77 in response to a reset signal RST.

Switched capacitor arrangement 70 includes second capacitor 72, first switch 71, second switch 73, third switch 74, and fourth switch 75. First switch 71 controls the connection between sensor cell 10 and second capacitor 72 in response to a first phase switching signal S71. Second switch 73 controls the connection between second capacitor 72 and comparator 78 in response to a second phase switching signal S72. Third switch 74 controls the connection between an output terminal of DAC 79 and second capacitor 72 in response to second phase switching signal S72. Fourth switch 75 controls the connection between second capacitor 72 and a second power line (e.g., ground) in response to first phase switching signal S71.

First phase switching signal S71 and second phase switching signal S72 may respectively have opposite phases to each other while the ADC performs standard conversion or signal conversion and periodically transit to a logic high level or logic low level.

Accordingly, the turn-on of first and fourth switches 71 and 75 and the turn-off of second and third switches 73 and 74 or the turn-off of first and fourth switches 71 and 75 and the turn-on of second and third switches 73 and 74 is periodically repeated. Switched capacitor arrangement 70 performing such operations may function similarly to a resistor. In some embodiments, switched capacitor arrangement 70 included in the integrator may be substituted with a resistor.

Quantizer 80 quantizes an output signal of the integrator and outputs a digital signal. In some embodiments, the digital signal output from quantizer 80 may be a single-bit or multi-bit signal. DAC 79 converts the digital signal into an analog signal and generates the feedback signal. DAC 79 provides the feedback signal to the integrator so that the integrator integrates a difference between the output voltage of sensor cell 10 and the feedback signal.

Digital filter 81 generates a digital output signal OUT based on the digital signal output from quantizer 80. Digital filter 81 may generate the digital output signal OUT by calculating an average of the digital signal which is a serial bit stream. Digital filter 81 may also eliminate out-of-band quantization noise and decrease the frequency of a signal.

In some embodiments, the ADC may perform single slope analog-to-digital conversion using dual CDS described above with respect to FIG. 6.

The operation of the data sampler having the above-described structure will be described below.

After sensor cell 10 outputs a reset voltage as an output voltage, the ADC receives the reset voltage and performs first conversion in which an offset signal of comparator 78 stored in second capacitor 72 into a first digital output signal OUT. First capacitor 77 is discharged since the reset signal RST is at a logic high level thereby closing switch 76 for a predetermined period of time and first and second phase switching signals S71 and S72 have the opposite phases to each other and periodically transit to the logic high level (i.e., closed state) or logic low level (i.e., opened state), and therefore, the first conversion is possible. At this time, comparator 78 does not perform comparison on the reset voltage using auto-zeroing and performs only the comparison on its own offset.

When a data voltage is output as the output voltage of sensor cell 10, the ADC stores a difference between the reset voltage and the data voltage and the offset signal of comparator 78, that is, the ADC stores a CDS value and performs second conversion in which the CDS value is compared and counted and is thus converted into a second digital output signal OUT.

A sensor apparatus including a data sampler having the above-described structure may obtain a digital value corresponding to an effective signal component based on a difference between the first digital output signal and the second digital output signal.

As described above, the data sampler may perform dual CDS by performing the first conversion and/or the second conversion.

FIG. 8 is a diagram of a cell array according to some embodiments of the present invention. The cell array of FIG. 8 includes an active sensor array having a plurality of sensor cells arranged in rows and columns, each of the sensor cells being configured to sense an environmental characteristic, and having a structure reflecting the characteristics described in detail in FIG. 1.

In particular the cell array of FIG. 8 includes an active pixel array 82 having a plurality of pixel cells that are each configured to sense light as an environmental characteristic, and to generate an electrical signal through photoelectric conversion of the sensed light. An AE-OB, or auto exposure, pixel array 85 is shown disposed beneath active pixel array 82. F-OBs 86a and 86b are shown respectively above active pixel array 82 and beneath AE-OB 85.

R-OBs 87a and 87b, each of which detects an offset for the offset compensation of a reference voltage, are respectively shown above F-OB 86a and beneath the F-OB 86b. L-OBs 83 and 84 are shown at both sides of active pixel array 82. L-OBs 83 and 84 may include L-OB 83 with a photo sensitive element, e.g., a photodiode, and L-OB 84 without a photodiode.

Both of L-OB 83 with a photodiode and L-OB 84 without a photodiode may be disposed together, or either of them may be separately disposed. L-OB 83 with a photodiode may be used for another purpose in digital signal processing (DSP).

AE-OB 85 may be used to obtain luminance allowing an analog gain to be set automatically.

All OBs described above may be disposed around active pixel array 82 and may be determined to be disposed, or not, according to their necessity.

Figure 9:
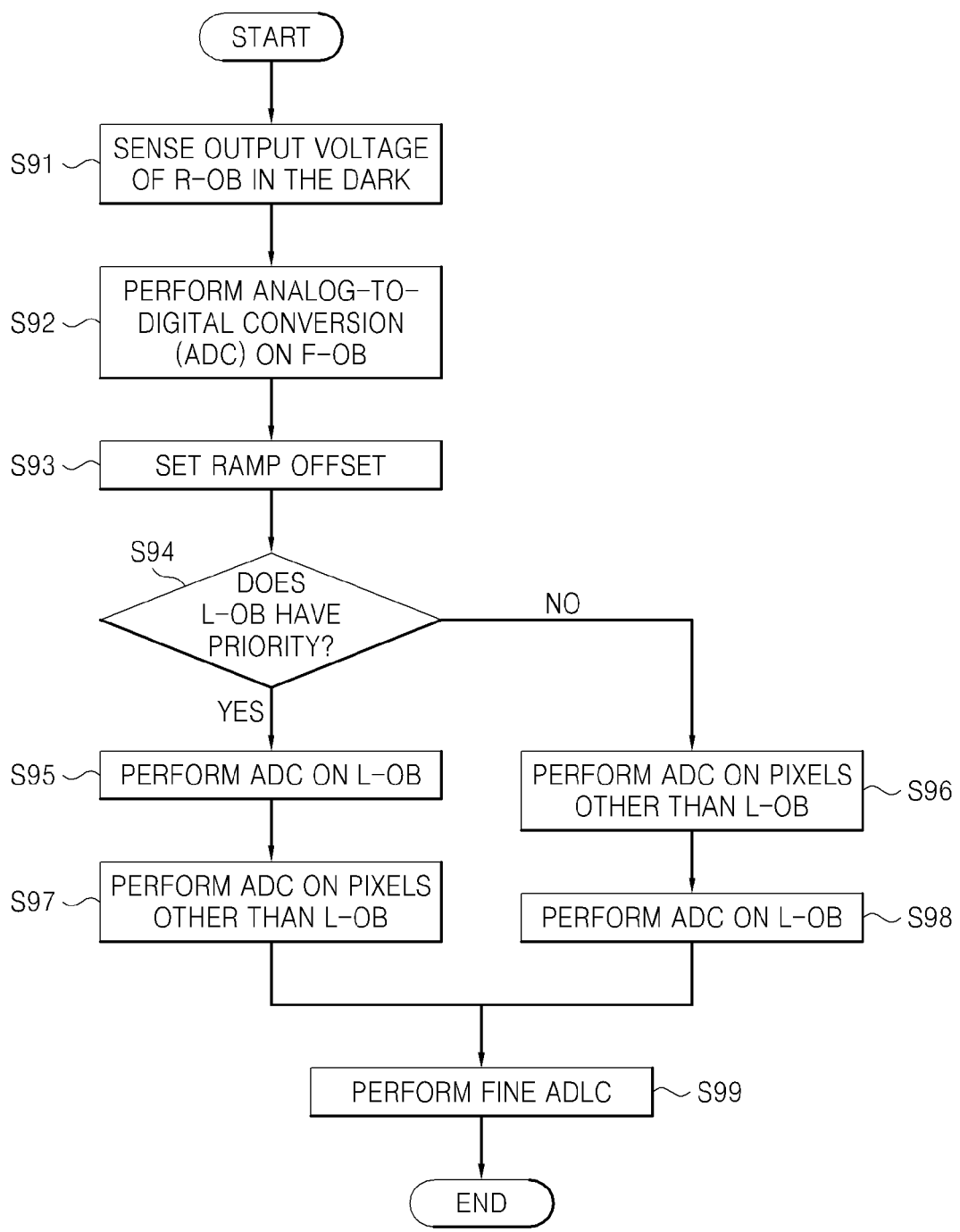
FIG. 9 is a flowchart of a method of auto dark level compensation (ADLC) according to some embodiments of the present invention.

FIG. 9 is a flowchart of a method of auto dark level compensation (ADLC) according to some embodiments of the present invention. Exemplary ADLC performed in a photo detecting apparatus will be described with reference to FIG. 9. The ADLC is performed to compensate for an offset caused by a difference in a signal transfer characteristic between sensor cells, between columns, and/or between rows in an array structure. The ADLC in the photo detecting apparatus is an operation of detecting a signal characteristic in the dark, and compensating the signal characteristic.

Firstly, a reference voltage offset value is detected to obtain an offset-compensated reference voltage, e.g., a ramp voltage in operations S91 through S93. In detail, a voltage output from an R-OB in the dark is sensed in operation S91. Thereafter, analog-to-digital conversion is performed with respect to an F-OB subjected to sensing using a ramp signal provided from a ramp generator, in which an analog gain is 1 and an offset of a ramp voltage is 0, in operation S92.

Since there may also be a difference between pixels in the F-OB, an average of analog-to-digital conversion values obtained with respect to a plurality of R-OBs may be taken to reflect the difference between pixels. Data which has been converted into a digital signal is processed into the offset of the ramp signal through image signal processing (ISP). As described above, the ramp offset is controlled to be fed back to the ramp generator, so that the offset-compensated reference signal or an offset-compensated ramp signal is generated.

Because analog-to-digital conversion is performed using the offset-compensated ramp signal, where the offset is obtained in analog-to-digital conversion performed after sensing is performed with respect to an active pixel array, distortion in a data signal (e.g., immeasurability of a pixel data signal) due to an offset occurring as the gain increases can be prevented.

After operations S91 through S93 are performed using ADLC, sensing and analog-to-digital conversion may be performed with respect to the active pixel array using the offset-compensated reference signal. Alternatively, operations S91 through S93 may be performed using coarse ADLC and then a procedure of measuring an offset of the F-OB during the sensing and analog-to-digital conversion of the active pixel array and compensating for the offset in the digital domain may be performed using fine ADLC. This operation may be added as operation S99 in FIG. 9.

As described above, an OB may include an L-OB, an F-OB, and an AE-OB. The F-OB and the AE-OB include a photo sensitive device, e.g., a photodiode, but the L-OB may not include a photodiode to eliminate a column offset. The L-OB with a photodiode may be treated together with the F-OB or the AE-OB in the sensing and analog-to-digital conversion procedure for the active pixel array. However, the sensing and analog-to-digital conversion procedure for the L-OB without a photodiode needs to be separated from the procedure for other pixels.

Accordingly, when the L-OB cells do not include a photodiode, then the priority between the sensing and analog-to-digital conversion for a pixel with a photodiode, and the sensing and analog-to-digital conversion for a pixel without a photodiode, is decided in operation S94.

After the priority is decided, if it is determined that the L-OB cells without the photodiode have priority, then the sensing and analog-to-digital conversion is performed on the L-OB first in operation 95, and then the sensing and analog-to-digital conversion is performed on the other cells in operation S97. On the other hand, if it is determined that the L-OB cells without the photodiode do not have priority, then the sensing and analog-to-digital conversion is performed first on the cells other than the L-OB cells in operation 86, and then the sensing and analog-to-digital conversion is performed on the L-OB cells in operation 98. Here, again, operations S94 through S98 illustrate a case where the L-OB cells do not include a photodiode. In cases where the L-OB cells include a photodiode, operations S94 through S98 are not necessary. This is because offset compensation of a reference voltage is not necessary for the L-OB without a photodiode.

Figure 10:
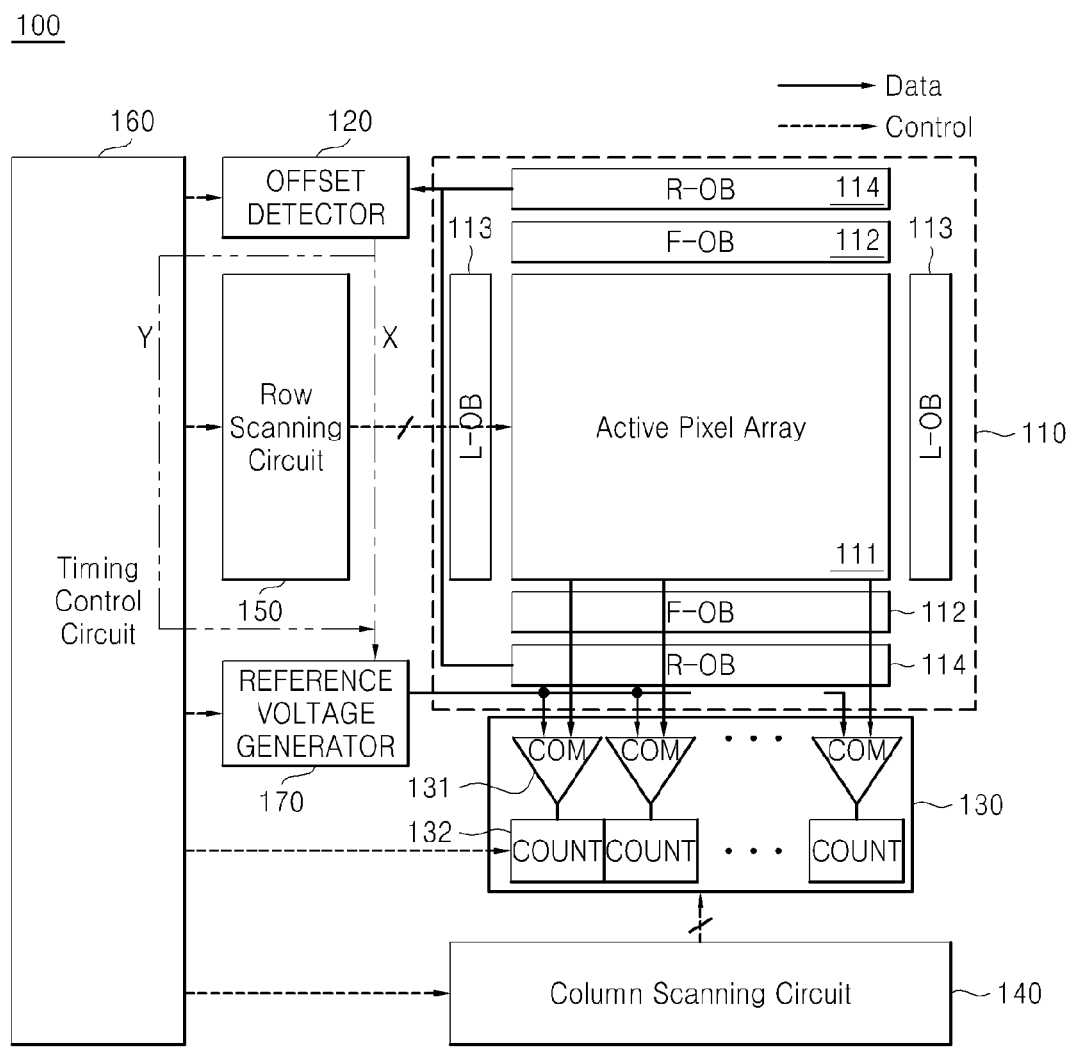
FIG. 10 is a block diagram of a photo detecting apparatus according to some embodiments of the present invention.

FIG. 10 is a block diagram of a photo detecting apparatus 100 according to some embodiments of the present invention.

Referring to FIG. 10, photo detecting apparatus 100 includes a cell array 110, an offset detector 120 for offset compensation of a reference signal, an ADC array 130, a column scanning circuit 140, a row scanning circuit 150, a timing control circuit 160, and a reference signal (or a reference voltage) generator 170.

Offset detector 120 and reference signal generator 170 may form a structure corresponding to offset-compensated reference voltage generators 30a and 30b shown in FIGS. 1 and 2. Cell array 110 includes an F-OB 112, an L-OB 113, and an R-OB 114. As described above, L-OB 113 may include a cell with a photodiode and a cell without a photodiode, together or separately. Although not shown, an AE-OB may also be provided. Sensor cell 10 outputting a reset voltage, a data voltage, and offset value may be a part of cell array 110.

ADC array 130 includes as many ADCs as the number of column lines connected to cell array 110. Each ADC includes a comparator 131 and a counter 132. Since the column lines connected to cell array 110 are respectively connected to the ADCs, it may be said that photo detecting apparatus 100 uses column analog-to-digital conversion.

Active pixel array 111 includes a plurality of pixel cells. The pixel cells may be arranged in a matrix of a plurality of rows and a plurality of columns. Each of the pixel cells may include a photo sensitive device (or a photoelectric conversion element) and a signal generation circuit (e.g., a circuit including a plurality of transistors).

The pixel cells may be classified into a 3-transistor structure, 4-transistor structure, a 5-transistor structure, and a 6-transistor structure according to the number of transistors included in the signal generation circuit. A row line may be wired on each row and a column line may be wired on each column in cell array 110. For instance, when cell array 110 includes M*N (M and N are 2 or an integer greater than 2) unit pixels, M row lines and N column lines are wired in cell array 110.

Row addressing and row scanning on cell array 110 may be controlled by row scanning circuit 150 through the row lines. Column addressing and column scanning on cell array 110 may be controlled by column scanning circuit 140 through the column lines.

When photo detecting apparatus 100 employs Bayer pattern technology, active pixel array 111 may include pixel cells receiving red (R) light, green (G) light, and blue (B) light, respectively. Alternatively, the pixel cells may respectively receive magenta (Mg) light, yellow (Y) light, cyan (Cy) light, and/or white (W) light.

Offset detector 120 may include a plurality of offset elimination circuits connected to respective ones of the column lines, or may include a single circuit. In some embodiments, a signal corresponding to an offset (value) is provided from R-OB 114 to offset detector 120 shown in FIG. 10. In some embodiments, a signal corresponding to an offset (value) output from R-OB 114 may be provided to offset detector 120 through ADC array 130 and an image signal processor (ISP) connected to the ADC array 130.

Reference signal generator 170 and offset detector 120 may be implemented in separate units, respectively, or in a single unit. Reference signal generator 170 may be directly controlled by offset detector 120 based on a detection result, as denoted by the line X. Alternatively, the detection result of offset detector 120 may be fed back to timing control circuit 160 and timing control circuit 160 may control reference signal generator 170 based on the feedback information, as denoted by the line Y.

ADC array 130 may include a plurality of unit ADCs respectively connected to the column lines. ADC array 130 may perform single CDS and analog-to-digital conversion or dual CDS and analog-to-digital conversion. ADC array 130 may be controlled by timing control circuit 160. The operation of ADC array 130 may be performed in each period in which row scanning circuit 150 selects a row line in pixel array 110, i.e., in each row scan period.

Row scanning circuit 150 may receive control signals from timing control circuit 160 and control row addressing and row scanning of cell array 110. At this time, row scanning circuit 150 applies a signal for activating one of the row lines to cell array 110 to select the row line. Row scanning circuit 150 may include a row decoder selecting a row line in pixel array 110 and a row driver providing a signal for activating the selected row line.

Column scanning circuit 140 may receive control signals from timing control circuit 160 and control column addressing and column scanning of pixel array 110. At this time, column scanning circuit 140 may output a digital output signal of ADC array 130 to a digital signal processing (DSP) circuit, an ISP circuit, or an external host.

For instance, column scanning circuit 140 outputs a horizontal scan control signal to ADC array 130 to sequentially select the plurality of unit ADCs in ADC array 130. Column scanning circuit 140 may include a column decoder selecting one of the unit ADCs and a column driver leading an output of the selected unit ADC to a horizontal transmission line. The horizontal transmission line may have a bit width for outputting the digital output signal.

Timing control circuit 160 may control offset detector 120, ADC array 130, column scanning circuit 140, and row scanning circuit 150 and may generate the control signals, such as a clock signal and a timing control signal, necessary for the operations thereof. In some embodiments, timing control circuit 160 may include a logic control circuit, a phase locked loop (PLL) circuit, and a communication interface circuit.

Figure 11:
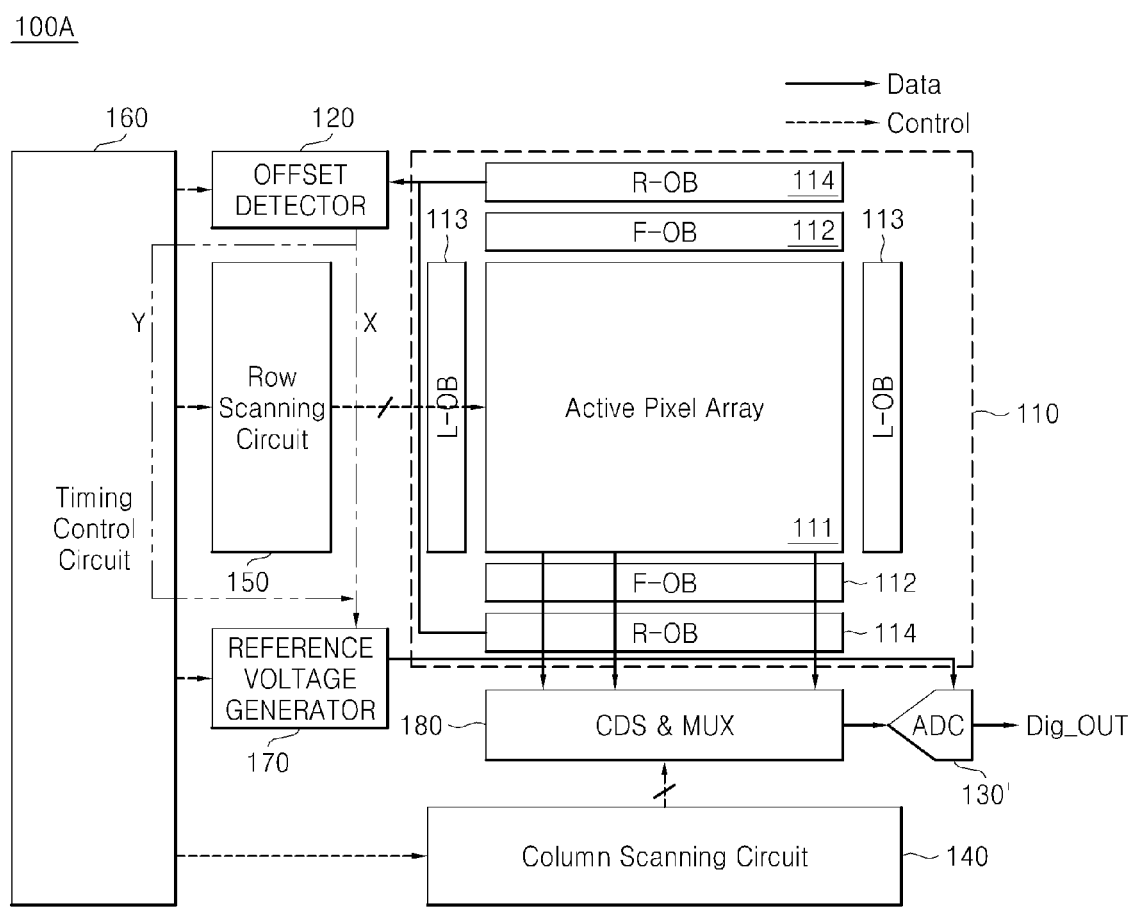
FIG. 11 is a block diagram of a photo detecting apparatus according to other embodiments of the present invention.

FIG. 11 is a block diagram of a photo detecting apparatus 100A according to other embodiments of the present invention. Since like numbers refer to like elements in FIGS. 10 and 11, detailed descriptions thereof will be omitted. Referring to FIG. 11, photo detecting apparatus 100A includes pixel array 110, offset detector 120, column scanning circuit 140, row scanning circuit 150, timing control circuit 160, reference signal generator 170, a CDS/multiplexer (MUX) 180, and an ADC 130'. photo detecting apparatus 100A illustrated in FIG. 11 has substantially the same structure as photo detecting apparatus 100 illustrated in FIG. 10, except for the structure of CDS/MUX 180 and ADC 130'.

CDS/MUX 180 may sequentially output analog voltages respectively corresponding to effective signal components respectively transmitted through the column lines. At this time, CDS may be performed simultaneously for all of the columns cell array 110. Such CDS may be performed in ADC 130' subsequent to CDS/MUX 180.

ADC 130' converts the analog voltages sequentially output from CDS/MUX 180 into digital signals. Unlike the embodiment illustrated in FIG. 10 in which an ADC is provided at each column, in the embodiment illustrated in FIG. 11 the analog outputs of all column lines are processed by the single ADC 130'. Accordingly, it can be said that photo detecting apparatus 100A illustrated in FIG. 11 employs single analogto-digital conversion by a single ADC. Photo detecting apparatus 100A converts the outputs of the plurality of column lines using a single ADC, thereby reducing a circuit area. In this case, the operating speed, i.e., the clock speed of ADC 130' needs to be faster than that of ADC array 130 illustrated in FIG. 10.

Figure 12:
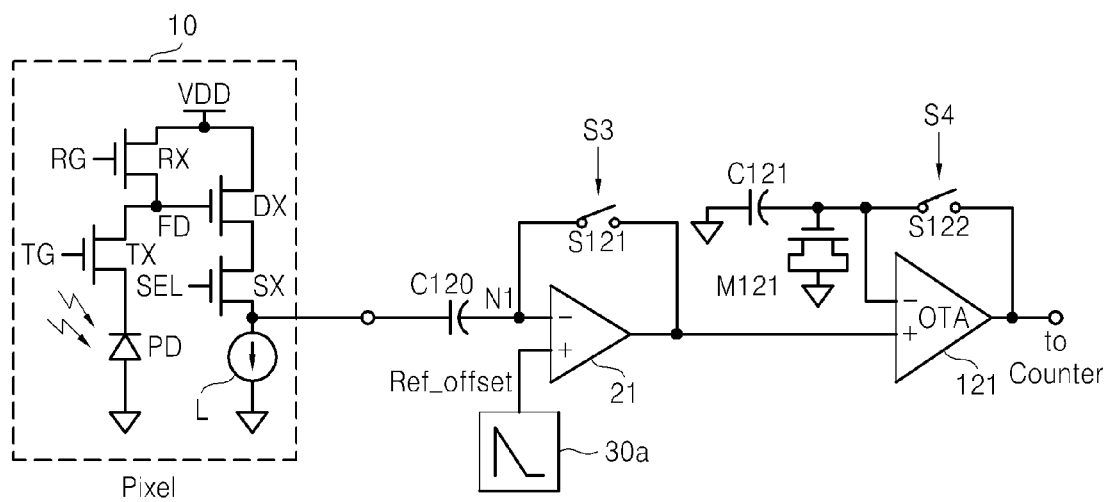
FIG. 12 is a circuit diagram of an example embodiment in which the sensor apparatus illustrated in FIG. 1 is applied to a four transistor (4T) CMOS image sensor.

FIG. 12 is a circuit diagram of an example embodiment in which the sensor apparatus illustrated in FIG. 1 is applied to a four transistor (4T) CMOS image sensor. Referring to FIG. 12, sensor cell 10 includes a photodiode PD and is a pixel cell for sensing light and producing an electrical output signal corresponding to the sensed light, sensor cell 10 also includes a transfer transistor TX including a gate controlled by a transfer gate control signal TG to transfer a photoelectric conversion signal integrated at the photodiode PD, a floating diffusion node FD storing the photoelectric conversion signal transferred through the transfer transistor TX or a reset signal, e.g., VDD transferred through a reset transistor RX including a gate controlled by a reset control signal RG, a drive transistor DX outputting a voltage of the floating diffusion node FD through a source using a source follower structure, and a select transistor SX which is turned on according to a predetermined timing to output a signal generated by sensor cell 10 in response to a column selection signal SEL.

Sensor cell 10 also includes a load current source L in order to increase the driving performance of a column line through which the signal generated by sensor cell 10 is transmitted.

A capacitor C120 for CDS is connected to the inverting input terminal (−) of comparator 21 and the offset-compensated reference signal Ref_offset from the offset-compensated reference voltage generator 30a is input to the non-inverting input terminal (+) of comparator 21. A switch S121 is disposed at a feedback loop formed between the inverting input terminal (−) of comparator 21 and the output terminal of comparator 21. The output terminal of comparator 21 is connected to a non-inverting input terminal (+) of an operational trans-conductance amplifier (OTA) 121. Comparator 21 may have the same operating characteristics as OTA 121. A switch S122 is disposed in a feedback loop formed between the inverting input terminal (−) of OTA 121 and an output terminal of OTA 121.

In addition, a capacitor C121 and a MOS capacitor M121 are disposed between the inverting input terminal (−) of OTA 121 and ground. OTA 121 is used to eliminate an offset that may occur in comparator 21 in the above-described structure. An output of OTA 121 is provided to a counter (not shown). The counter may include a structure in which a plurality of flip-flops are connected to each other.

The structure illustrated in FIG. 12 has been described above in the description of the dual CDS. Thus, detailed descriptions thereof will not be repeated.

Differences between the ADLC described in FIG. 9 and the operation performed depending on whether an L-OB includes a photodiode or not, which has been mentioned in the structure shown in FIG. 10, will be described in detail below.

Figure 13:
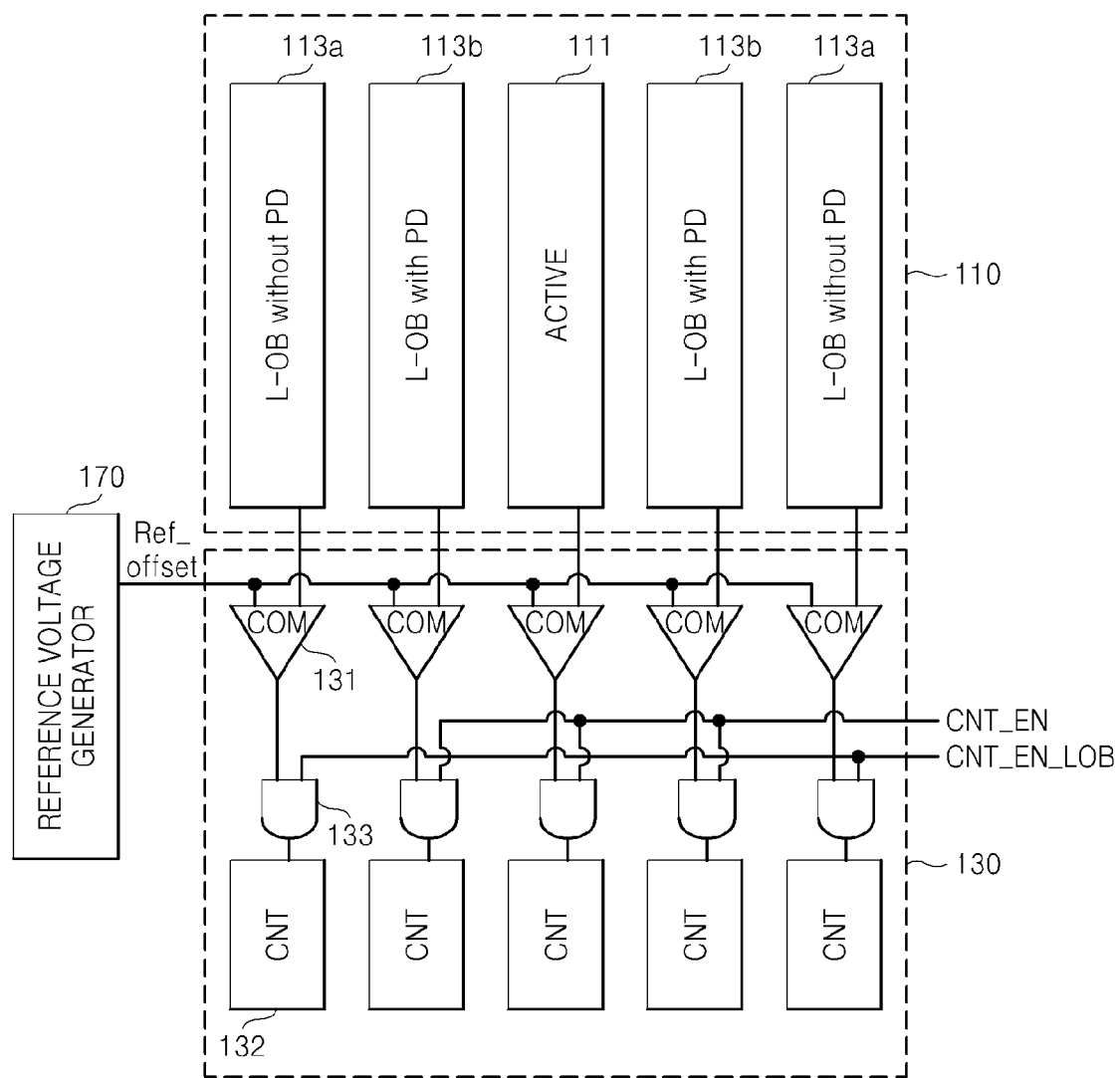
FIG. 13 is a schematic block diagram of an example of an arrangement of a CMOS image sensor including a line optical black region in a pixel array.
Figure 14:
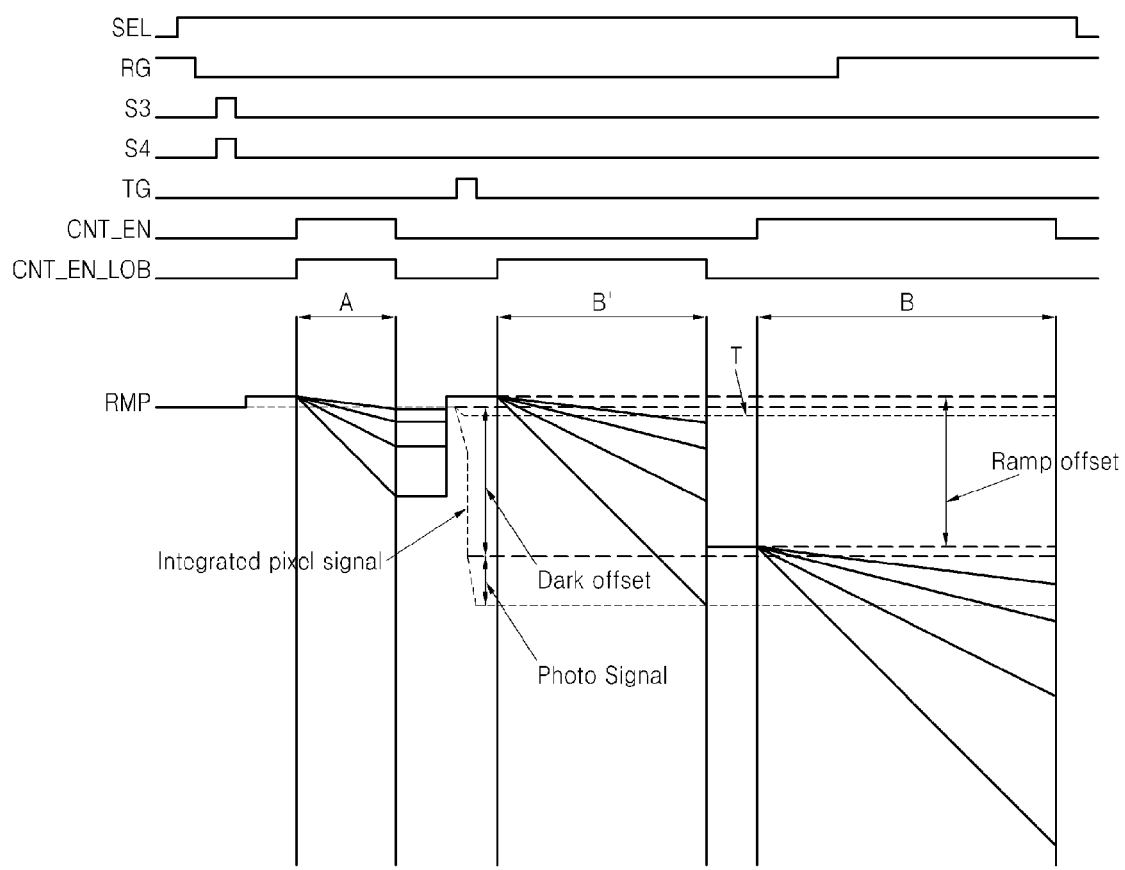
FIGS. 14 and 15 are timing diagram showing the operations of the arrangement illustrated in FIG. 13.
Figure 15:
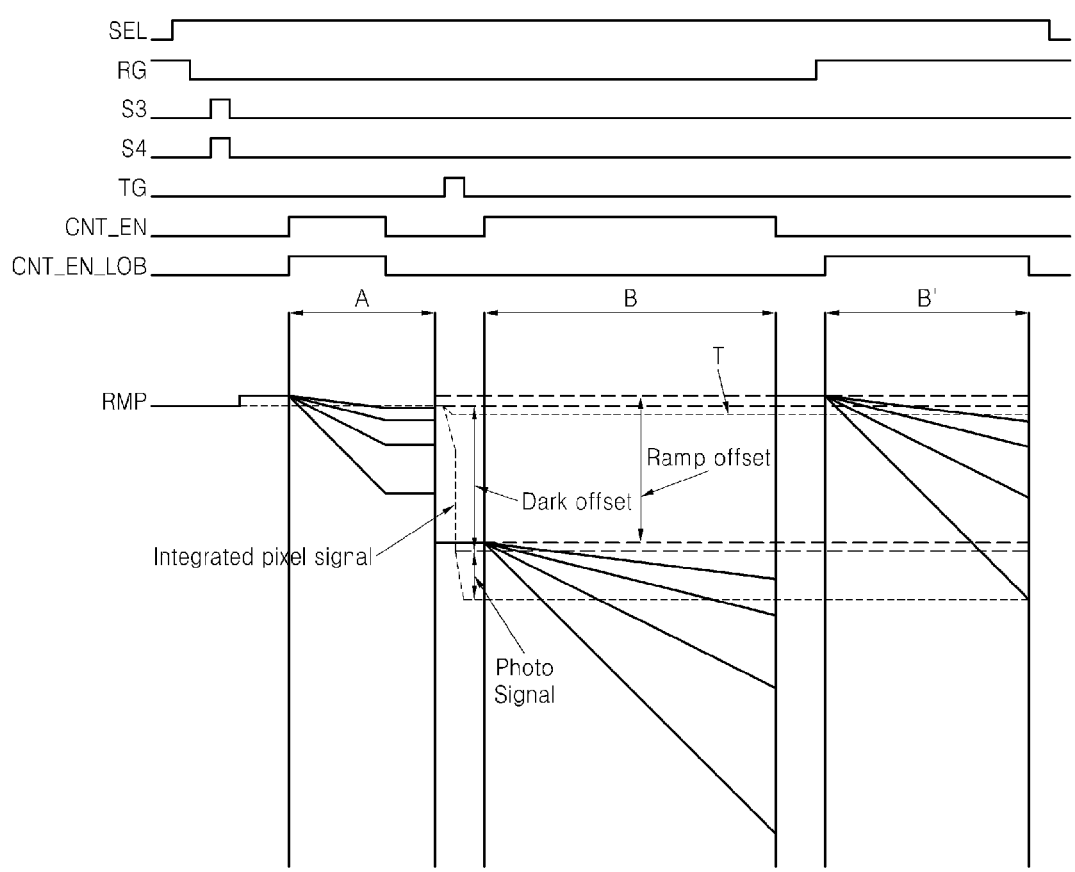

FIG. 13 is a schematic block diagram of an example of an arrangement of a CMOS image sensor including an L-OB in a cell array. FIGS. 14 and 15 are timing diagrams showing the operations of the CMOS image sensor having a structure as illustrated in FIG. 13.

Referring to FIG. 13, active pixel array 111 is shown at the center of pixel array 110 and an L-OB 113b with a photodiode and an L-OB 113a without a photodiode are shown on either side of active pixel cell array 111 in a row direction in cell array 110.

According to the usage of the CMOS image sensor, both of L-OB 113b with a photodiode, and L-OB 113a without a photodiode, may be included or either of them may be separately included without the other. In the current embodiments, both L-OBs 113a and 113b are included. In addition, although not shown, an F-OB and an AE-OB may be selectively provided in, or omitted from, pixel array 110.

A signal (or a signal voltage) output from cell array 110 is input to a non-inverting or an inverting input terminal of a comparator 131 provided at each column and the offset-compensated reference signal Ref_offset from offset-compensated reference voltage generator 170 is input to the other input terminal of comparator 131. A first count enable signal CNT_EN is used to control the counting of a signal output from L-OB 113b with a photodiode and a signal output from active pixel array 111. A second count enable signal CNT_EN_LOB is used to control the counting of a signal output from L-OB 113a without a photodiode.

An AND gate 133 receives a signal output from each column in pixel array 110 and either of the first and second count enable signals CNT_EN and CNT_EN_LOB.

AND gate 133 is just an example and may be substituted with any logic circuit which can control the counting of the signal output from pixel array 110 in response to the first or second count enable signal CNT_EN or CNT_EN_LOB.

As described above, L-OB 113b with a photodiode may be sensed simultaneously with active pixel array 111, but it is impossible to sense L-OB 113a without a photodiode simultaneously with active pixel array 111.

FIG. 14 shows a case where analog-to-digital conversion on L-OB 113a without a photodiode is performed first. FIG. 15 shows a case where analog-to-digital conversion on L-OB 113b with a photodiode and active pixel array 111 is performed first. Here, differences between the operations illustrated in FIGS. 14 and 15 and the operations illustrated in FIGS. 3 and 9 will be described.

Operations performed in periods A and B in FIGS. 14 and 15 for single slope analog-to-digital conversion using dual CDS are the same as those performed in the periods A and B in FIG. 3. However, in case of L-OB 113a without a photodiode, a level of data voltage output from a pixel is low at a level T as shown in the period B, and therefore, an offset is not applied to a reference signal, e.g., a ramp signal. Accordingly, periods B and B' need to be separately processed. For instance, a signal S3 may be applied to switch S121 and a signal S4 may be applied to switch S122 illustrated in FIG. 12.

Figure 16A:
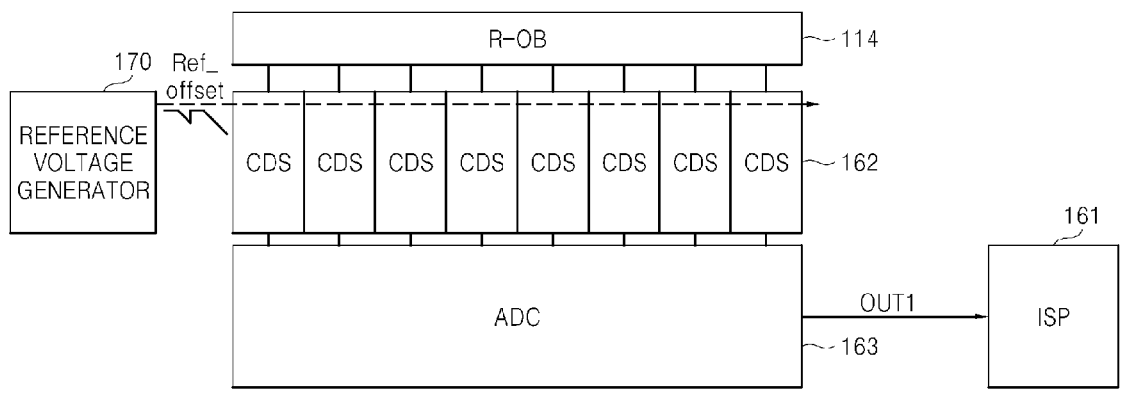
FIGS. 16A and 16B are diagrams showing a part of a CMOS image sensor to explain offset compensation of a reference voltage.
Figure 16B:
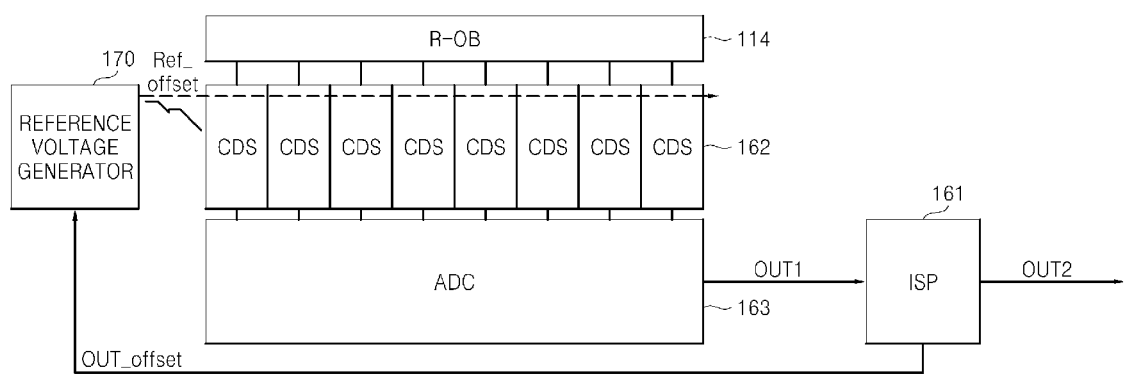

FIGS. 16A and 16B are diagrams showing a part of a CMOS image sensor to explain offset compensation of a reference voltage. FIG. 16A shows a procedure in which a digital output voltage OUT1 is generated from R-OB 114. FIG. 16B shows a procedure in which the digital output voltage OUT1 is processed by an ISP circuit 161 and ISP circuit 161 outputs an offset-compensated control signal OUT_offset as a feedback control signal to offset-compensated reference voltage generator 170.

Like numbers refer to like elements in FIGS. 10, 11, 16A and 16B and detailed descriptions thereof will be omitted. Here, it is assumed that CDS is performed on an output of R-OB 114 by an analog CDS block 162 arranged at each column and a CDS output is input to an ADC 163. This example may also be embodied in the structures shown in FIGS. 10 and 11 and a structure combining the structures shown in FIGS. 10 and 11. For instance, a separate CDS block 162 may be provided at each column and a single ADC 163 may be provided for all CDS blocks 162.

The digital output voltage OUT1 is provided to ISP circuit 161. ISP circuit 161 processes the digital output voltage OUT1 and outputs an offset-compensated control signal OUT_offset. Offset-compensated reference voltage generator 170 is controlled by the offset-compensated control signal OUT_offset. ISP circuit 161 also outputs a processed digital signal output OUT2 in a normal operation.

Figure 17A:
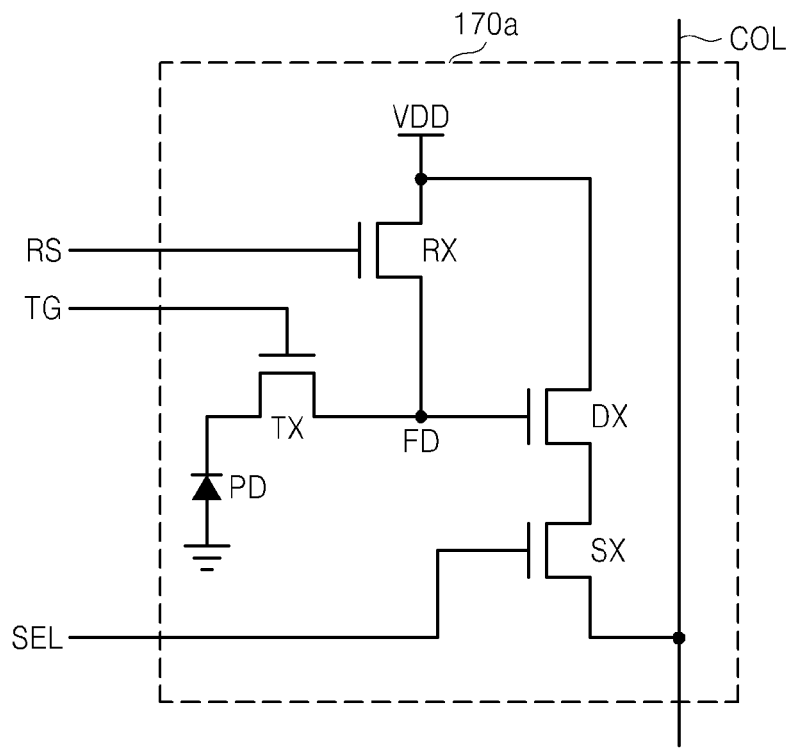
FIGS. 17A through 17D are circuit diagrams of examples of pixel cells which may be included in the sensor apparatus shown in FIG. 1, 2, 6, or 7 according to some embodiments of the present invention.

FIGS. 17A through 17D are circuit diagrams of examples of a pixel cells which are examples of sensor cells which may be included in the sensor apparatuses shown in FIG. 1, 2, 6, 7, 10 or 11 according to some embodiments of the present invention. Referring to FIG. 17A, a pixel cell 170a includes a photo sensitive device PD, a transfer transistor TX, a floating diffusion node FD, a reset transistor RX, a drive transistor DX, and a select transistor SX.

The connections and the operations of the elements PD, TX, FD, RX, DX, and SX have been described in FIG. 12 showing sensor cell 10 having the 4T structure. The photo sensitive device PD may include at least one among a photodiode, a photo transistor, a photo gate, a pinned photodiode (PPD), and a combination thereof.

FIG. 17A illustrates a pixel cell 170a having the 4T structure, which includes the single photo sensitive device PD and the four MOS transistors TX, RX, DX, and SX, but the present invention is not restricted to the current embodiments. Embodiments of the present invention can be applied to any circuit including the photo sensitive device PD and at least three transistors including the drive transistor DX and the select transistor SX. Pixel cells according to different embodiments of the present invention are illustrated in FIGS. 17B through 17D.

Figure 17B:
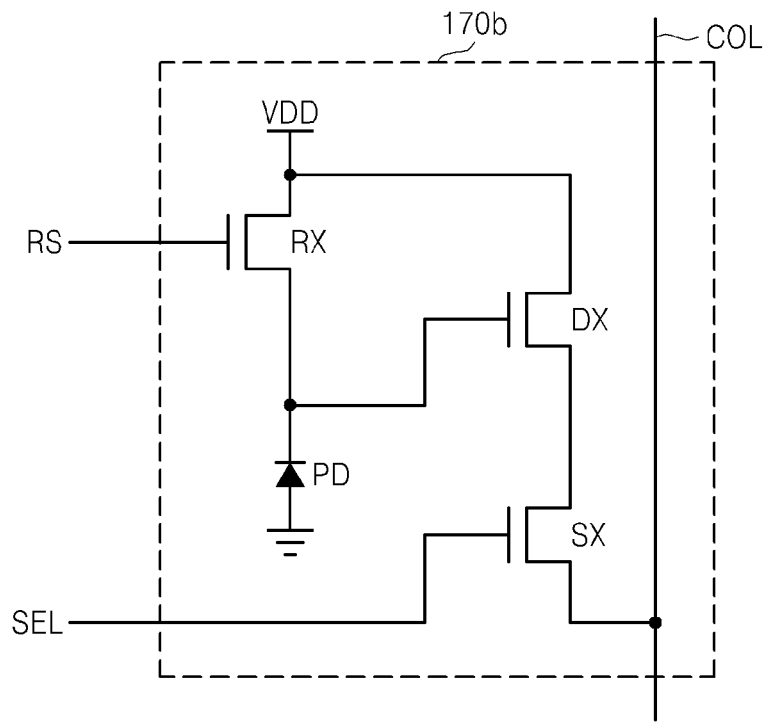
Figure 17C:
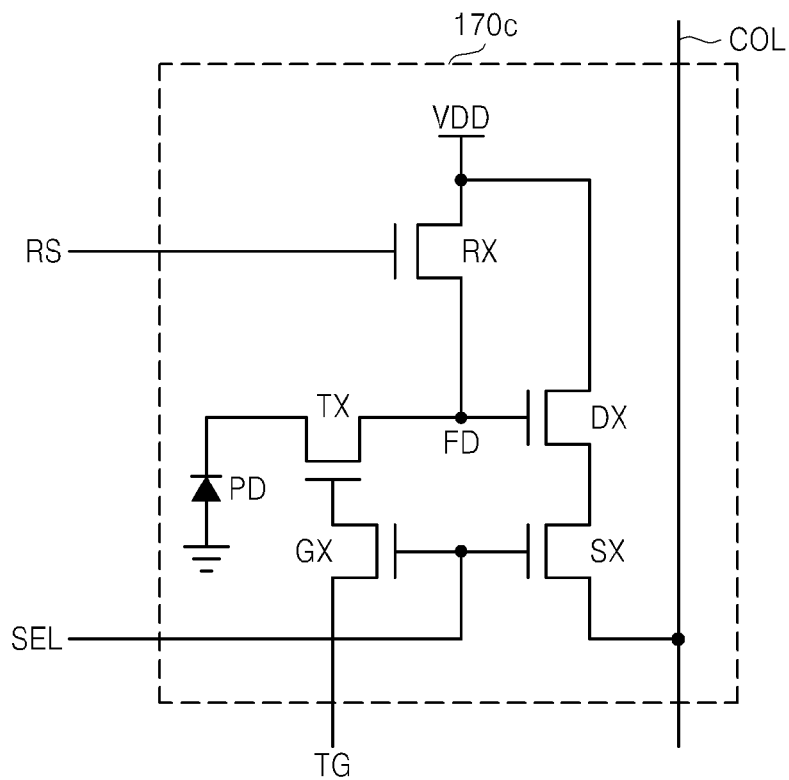
Figure 17D:
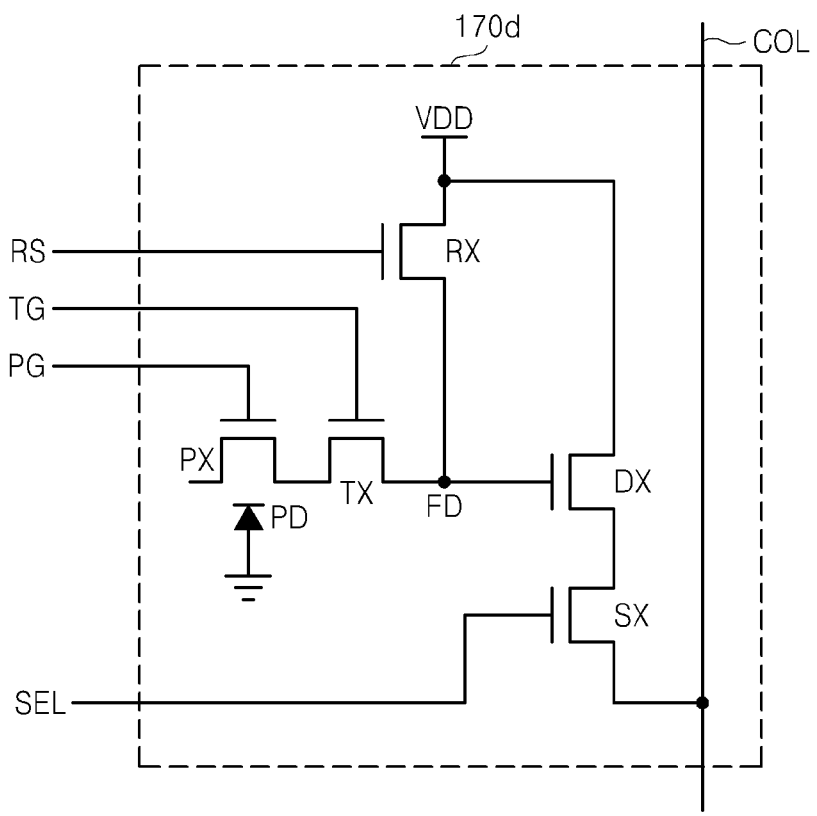

A pixel cell 170b illustrated in FIG. 17B has a three transistor (3T) structure and includes a photo sensitive device PD, a reset transistor RX, a drive transistor (or a source follower transistor) DX, and a select transistor SX. Referring to FIGS. 17A and 17C, a pixel cell 170c illustrated in FIG. 17C has a five transistor (5T) structure and includes one transistor GX in addition to the photo sensitive device PD, the transfer transistor TX, the reset transistor RX, the drive transistor (or the source follower transistor) DX, and the select transistor SX. A pixel cell 170d illustrated in FIG. 17D has the 5T structure and includes two more transistors TX and PX in addition to the photo sensitive device PD, the reset transistor RX, the drive transistor (or the source follower transistor) DX, and the select transistor SX.

Various types of pixel cells as shown in FIGS. 17A through 17D may have an independent structure, as described above, or may share at least one element with each other. For instance, in the structure illustrated in FIG. 17A, two or four pixels may include only the photo sensitive device PD and the transfer transistor TX independently, and share the other elements with one another and independently operate through timing control. In some embodiments, sensor cell 10 illustrated in FIG. 1, 2, 6, 7, or 12 may be replaced with the pixel cell 170a, 170b, 170c or 170d. In this case, a column line COL of the pixel cell 170a, 170b, 170c or 170d is connected to comparator 21, switch 61, switch 71, or capacitor C120. In addition, the pixel cell 170a, 170b, 170c or 170d may include R-OB 114 outputting offset value Offset for offset compensation.

Figure 18A:
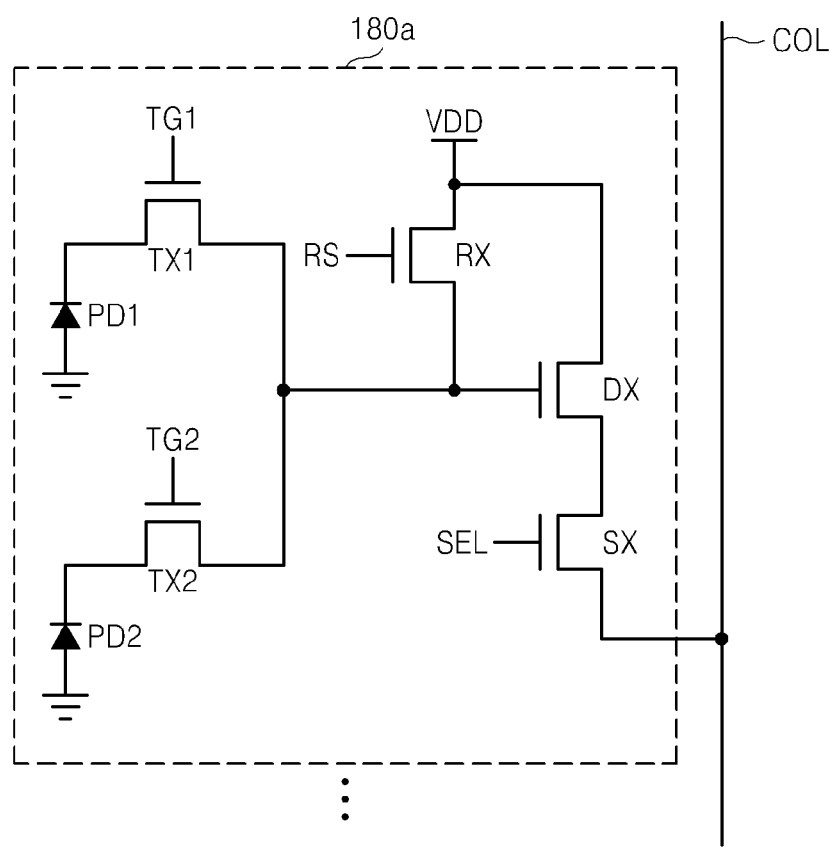
FIGS. 18A and 18B are circuit diagrams of shared pixel cells which may be included in a photo detecting apparatus according to some embodiments of the present invention.
Figure 18B:
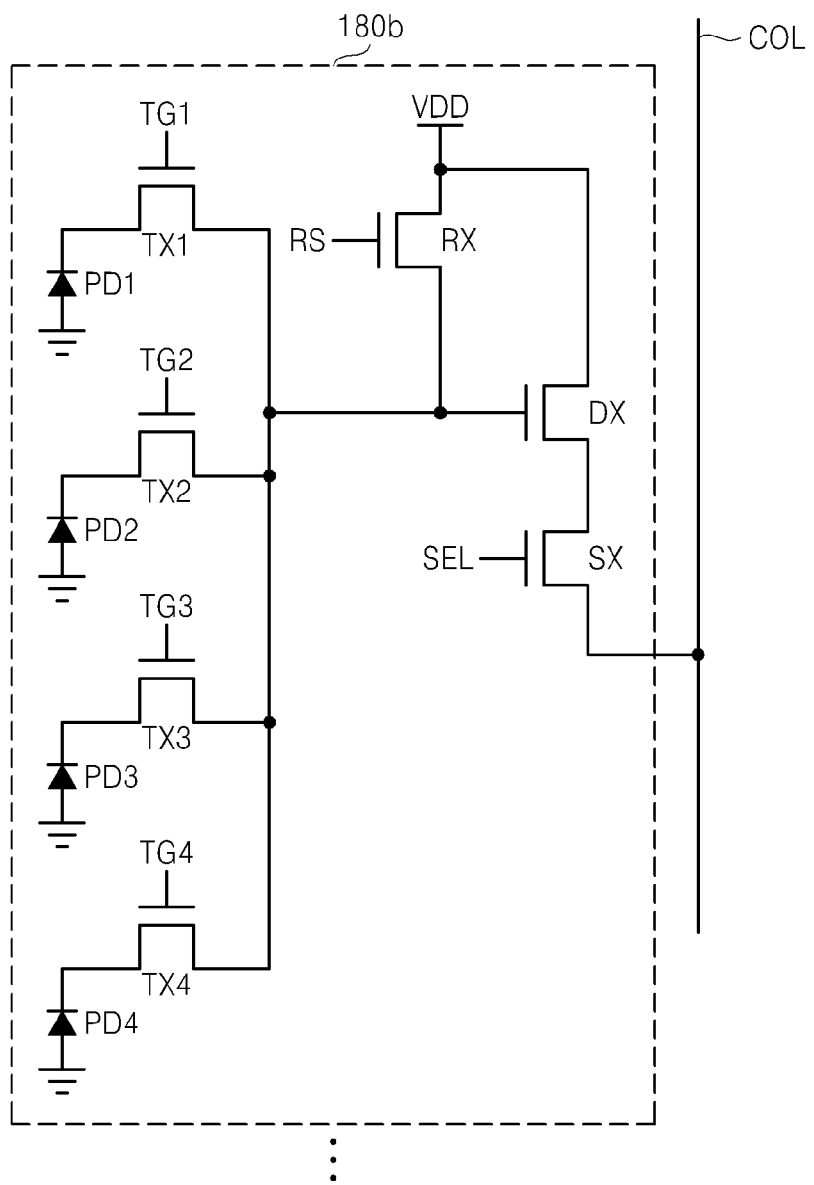

FIGS. 18A and 18B are circuit diagrams of shared pixels included in a photo detecting apparatus according to some embodiments of the present invention. Referring to FIG. 18A, the photo detecting apparatus includes a shared pixel 180a in which two pixel cells share the reset transistor RX, the drive transistor DX, and the select transistor SX with each other. Since the two pixel cells share the transistors RX, DX, and SX, the proportion of an area of the photo sensitive device PD increases. As a result, the fill factor of the photo detecting apparatus may be increased.

Since the two pixel cells respectively positioned at two different rows share a part of a circuit with each other in shared pixel 180a, the two rows may operate sequentially or separately in terms of time.

Referring to FIG. 18B, the photo detecting apparatus includes a shared pixel 180b in which four pixel cells share the reset transistor RX, the drive transistor DX, and the select transistor SX with one another. Since the four pixel cells share the transistors RX, DX, and SX, the proportion of an area of the photo sensitive device PD increases. As a result, the fill factor of the photo detecting apparatus may be increased. Although the four pixel cells share the transistors RX, DX, and SX, they can operate independently through timing control. In some embodiments, sensor cell 10 illustrated in FIG. 1, 2, 6, 7, or 12 may be replaced with the pixel cell 180a or 180b. In this case, a column line COL of the pixel cell 180a or 180b is connected to comparator 21, switch 61, switch 71, or capacitor C120. In addition, the pixel cell 180a or 180b may include R-OB 114 outputting offset value Offset for offset compensation.

FIGS. 18A and 18B illustrate embodiments in which two or four unit pixels share the transistors RX, DX, and SX with one another. In other embodiments, three, five or more unit pixels may share at least one transistor with one another.

Figure 19:
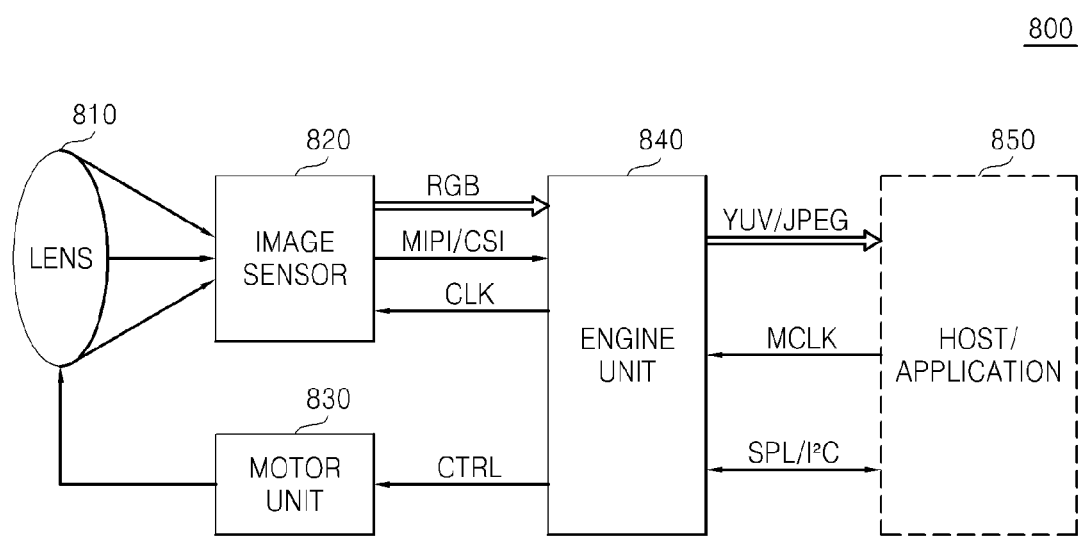
FIG. 19 is a block diagram of an example in which a photo detecting apparatus, e.g., an image sensor, is applied to a digital camera according to some embodiments of the present invention.

FIG. 19 is a block diagram of an example in which a photo detecting apparatus, e.g., an image sensor, is applied to a digital camera 800 according to some embodiments of the present invention. Referring to FIG. 19, digital camera 800 includes a lens 810, an image sensor 820, a motor unit 830, and an engine unit 840. Image sensor 820 uses an offset-compensated reference voltage as a reference voltage for analog-to-digital conversion.

Lens 810 focuses incident light onto a light receiving region of image sensor 820. Image sensor 820 may generate RGB data in a Bayer pattern based on the light received through lens 810. Image sensor 820 may provide the RGB data in response to a clock signal CLK.

In other embodiments, image sensor 820 may interface with engine unit 840 using a mobile industry processor interface (MIPI®) and/or a camera serial interface (CSI).

Motor unit 830 may adjust the focus of lens 810 in response to a control signal CTRL received from engine unit 840 or perform shuttering. Engine unit 840 controls image sensor 820 and motor unit 830. Engine unit 840 may generate YUV data including a luminance component, a difference between the luminance component and a blue component, and a difference between the luminance component and a red component based on the RGB data received from image sensor 820 or generate compressed data, e.g., Joint Photography Experts Group (JPEG) data.

Engine unit 840 may be connected to a host/application 850 and may provide the YUV data or JPEG data to host/application 850 based on a master clock signal MCLK. In addition, engine unit 840 may interface with host/application 850 using a serial peripheral interface (SPI) and/or an inter integrated circuit (I²C).

Figure 20:
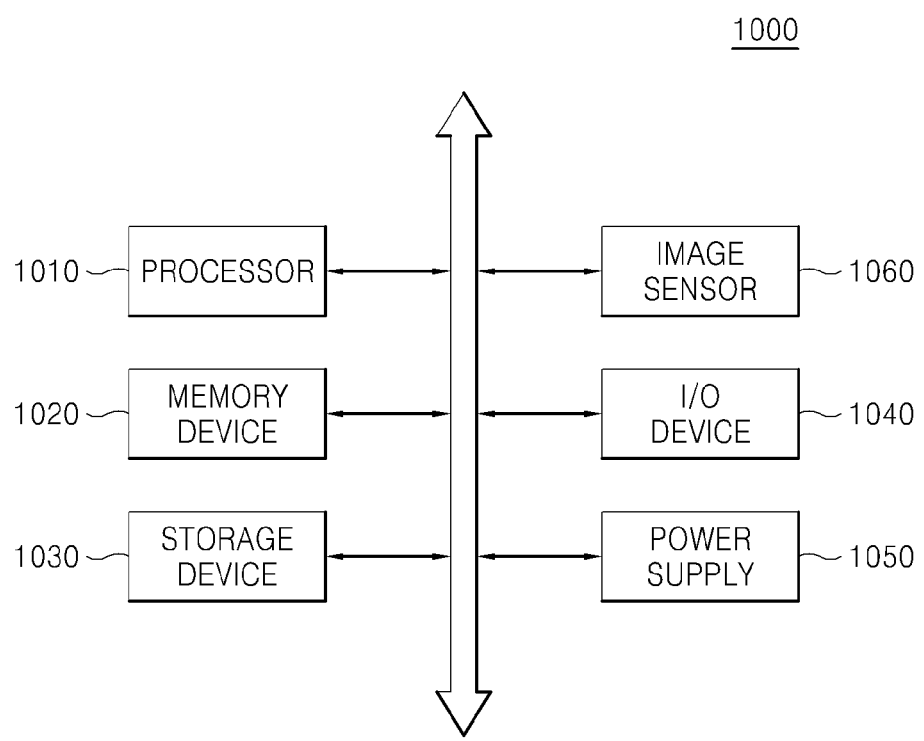
FIG. 20 is a block diagram of an example in which a photo detecting apparatus, e.g., an image sensor, is applied to a computing system according to some embodiments of the present invention.

FIG. 20 is a block diagram of an example in which a photo detecting apparatus, e.g., an image sensor, is applied to a computing system 1000 according to some embodiments of the present invention. Referring to FIG. 20, computing system 1000 includes a processor 1010, a memory device 1020, a storage device 1030, an input/output (I/O) device 1040, a power supply 1050, and an image sensor 1060.

Image sensor 1060 uses an offset-compensated reference voltage as a reference voltage in analog-to-digital conversion. Although not shown, computing system 1000 may also include ports that can communicate with video cards, sound cards, memory cards, universal serial bus (USB) devices, or other electronic devices.

Processor 1010 may perform particular calculations or tasks. In some embodiments, processor 1010 may be a microprocessor or a central processing unit (CPU). Processor 1010 may communicate with memory device 1020, storage device 1030, and I/O device 1040 through an address bus, a control bus, and a data bus.

In some embodiments, processor 1010 may also be connected to an extended bus such as a peripheral component interconnect (PCI) bus. Memory device 1020 may store data necessary for the operations of computing system 1000.

Memory device 1020 may be implemented by dynamic random access memory (DRAM), mobile DRAM, static RAM (SRAM), phase-change RAM (PRAM), ferroelectric RAM (FRAM), resistive RAM (RRAM) and/or magnetoresistive RAM (MRAM). Storage device 1030 may include a solid state drive (SSD), a hard disk drive (HDD), and a compact disk-read only memory (CD-ROM).

I/O device 1040 may include an input device such as a keyboard, a keypad, and a mouse and an output device such as a printer and a display. Power supply 1050 may provide an operating voltage necessary for the operation of computing system 1000.

Image sensor 1060 may communicate with processor 1010 through buses or other communication links. As described above, image sensor 1060 compensates for an offset of the reference voltage, thereby generating accurate image data. Image sensor 1060 and processor 1010 may be integrated together into a single chip or may be separately integrated into different chips, respectively.

Computing system 1000 may be any type of computing system using an image sensor. For instance, computing system 1000 may be a digital camera, a cellular phone, a personal digital assistant (PDA), a portable multimedia player (PMP), a smart phone, or a tablet personal computer (PD).

Figure 21:
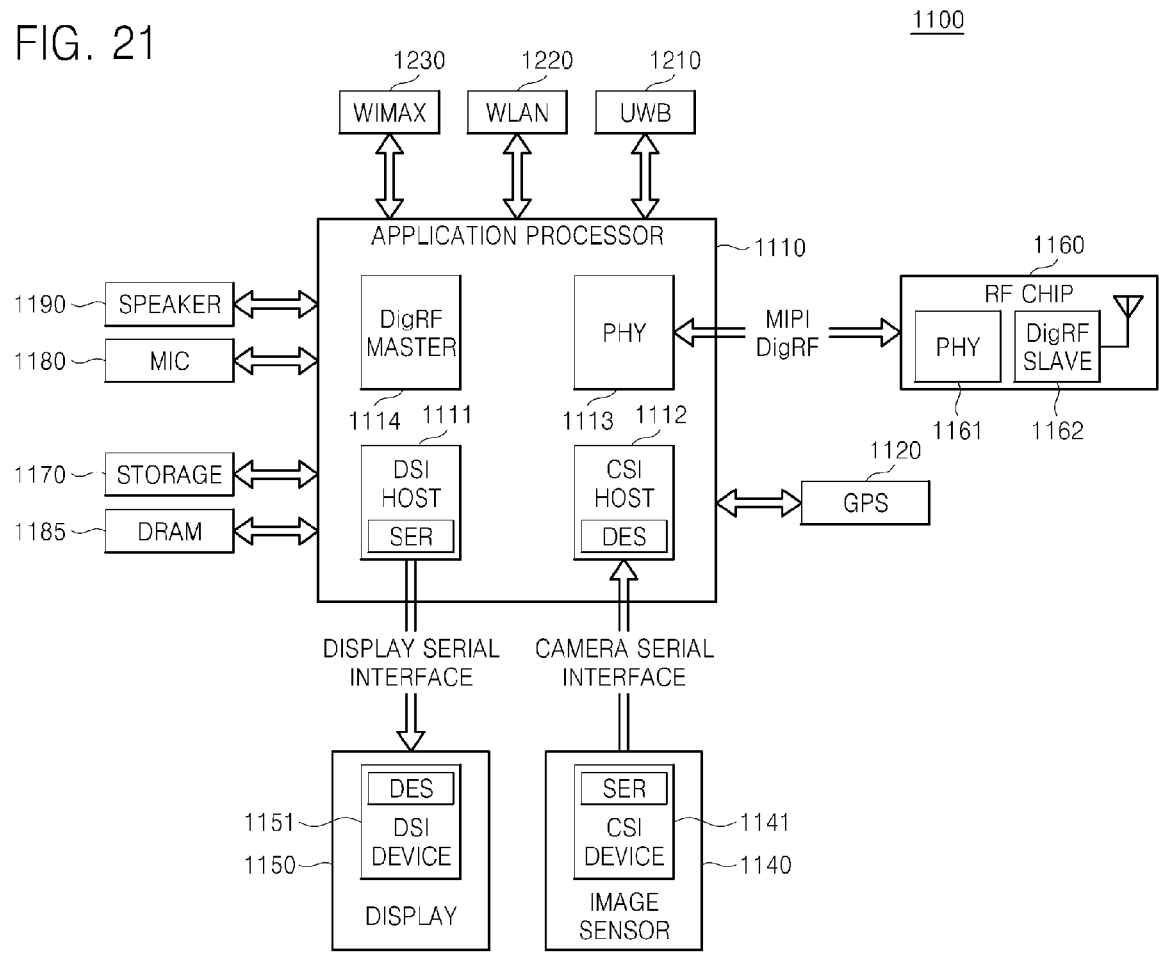
FIG. 21 is a block diagram of another example in which a photo detecting apparatus, e.g., an image sensor, is applied to a computing system according to some embodiments of the present invention.

FIG. 21 is a block diagram of another example in which a photo detecting apparatus, e.g., an image sensor 1140, is applied to a computing system 1100 according to some embodiments of the present invention. Referring to FIG. 21, computing system 1100 may be implemented as a data processing device which can use or support MIPI® and may include an application processor 1110, an image sensor 1140, and a display 1150.

A CSI host 1112 included in application processor 1110 may perform serial communication with a CSI device 1141 included in image sensor 1140 through CSI.

CSI host 1112 may include a deserializer DES and CSI device 1141 may include a serializer SER. A display serial interface (DSI) host 1111 included in application processor 1110 may perform serial communication with a DSI device 1151 included in display 1150 through DSI.

DSI host 1111 may include a serializer SER and DSI device 1151 may include a deserializer DES. Computing system 1100 may also include a radio frequency (RF) chip 1160 which can communicate with application processor 1110. A physical layer (PHY) 1113 of application processor 1110 and a PHY 1161 of RF chip 1160 may communicate data with each other according to MIPI DigRF.

Application processor 1110 may also include a DigRF master 1114 which controls PHY 1113 and/or PHY 1161 to transmit and receive data according to the MIPI DigRF. Computing system 1100 may further include a global positioning system (GPS) 1120, a storage 1170, a microphone (MIC) 1180, a DRAM 1185, and a speaker 1190. Computing system 1100 may communicate using an ultra-wideband (UWB) interface 1210, a wireless local area network (WLAN) 1220, and a worldwide interoperability for microwave access (WIMAX) interface 1230. The structure and the interface of computing system 1100 illustrated in FIG. 21 is just an example, and the present invention is not restricted thereto.

According to some embodiments of the present invention, a photo detecting apparatus minimizes the impact of an offset when a signal of a sensor cell is weak. In addition, the photo detecting apparatus extracts only a data component from the signal of the sensor cell and converts the data component into a digital signal.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. A device, comprising:
    an active sensor array comprising a plurality of sensor cells arranged in rows and columns, each of the sensor cells being configured to sense an environmental characteristic;
    at least one block of cells not belonging to the active sensor array; and
    a data sampler for sampling an output of the active sensor array, the data sampler comprising
        at least one analog-to-digital converter (ADC) configured to receive the output of the active sensor array and to generate therefrom a sampled output that is compensated for an offset determined from an output of the at least one block of cells not belonging to the active sensor array, and
        an offset-compensated reference voltage generator configured to generate an offset-compensated reference voltage based on the offset, the at least one ADC comprising
            at least one comparator configured to compare an input provided thereto with the offset-compensated reference voltage,
            a digital-to-analog converter (DAC) configured to convert an output of the at least one comparator to provide a feedback signal, and
            a switched capacitor arrangement configured to provide a difference between the output of the active sensor array and the feedback signal as the input provided to the at least one comparator for comparison with the offset-compensated reference voltage.

2. The device of claim 1, wherein the active sensor array is an array of active pixel cells each including at least one photodiode, and wherein the output of the active sensor array comprises pixel data.

3. The device of claim 1, wherein the offset-compensated reference voltage generator includes a ramp voltage generator configured to generate a ramp voltage, and wherein the offset-compensated reference voltage generator is configured to offset the ramp voltage by the offset.

4. The device of claim 3, wherein the at least one ADC further comprises:
    at least one counter configured to output a digital count value for which the output of the active sensor array matches the offset-compensated reference voltage.

5. The device of claim 4, further comprising a multiplexer for multiplexing output signals from the columns of the active sensor array to generate the output, wherein an output of the multiplexer is supplied to the comparator.

6. The device of claim 4, wherein the least one comparator includes a plurality of comparators each connected to receive a corresponding output signal of a corresponding one of the columns of the active sensor array, and wherein each of the comparators also receives the offset-compensated reference voltage and compares the corresponding output signal of the corresponding one of the columns of the active sensor array with the offset-compensated reference voltage.

7. The device of claim 6, wherein the least one counter includes a plurality of counters each of which is connected to a corresponding output of a corresponding one of the comparators and which is configured to output a corresponding digital count value for which the corresponding output signal of a corresponding one of the columns of the active sensor array matches the offset-compensated reference voltage.

8. The device of claim 6, wherein the least one counter consists of a single counter which is connected to outputs of all of the comparators and which is configured to output digital count values for which the output signals of the columns of the active sensor array match the offset-compensated reference voltage.

9. A device, comprising:
an offset-compensated reference signal generator configured to receive a first signal including offset information, to compensate a reference signal with the offset information, and to generate an offset-compensated reference signal; and
an analog-to-digital converter (ADC) comprising
a comparator configured to receive an input signal, and to compare the offset-compensated reference signal with the input signal,
a digital-to-analog converter (DAC) configured to convert an output of the comparator to provide a feedback signal, and
a switched capacitor arrangement configured to provide a difference between a second signal including data and the feedback signal as the input signal received by the comparator for comparison with the offset-compensated reference signal.

10. The device of claim 9, wherein the first signal and the second signal are respectively output from a first pixel and a second pixel of a pixel array, which have a same structure as each other, wherein the first signal comprises an output in a state where the first pixel does not have an input, and wherein the second signal comprises an output in a state where the second pixel does have an input.

11. The device of claim 10, wherein the ADC receives the first signal from the first pixel, and the second signal from the second pixel separately.

12. The device of claim 9, further comprising a counter configured to count an output of the comparator and output a digital signal.

13. The device of claim 9, further comprising:
a pixel array configured to output the first signal and the second signal including data.

14. An apparatus comprising:
a pixel array comprising:
an active pixel which outputs a photo sensing signal, and
a dark pixel which outputs a dark offset signal for offset compensation of a reference signal;
an offset-compensated reference signal generator configured to compensate the reference signal with an offset based on the dark offset signal, and to generate an offset-compensated reference signal; and
an analog-to-digital converter (ADC) comprising
a comparator configured to compare the offset-compensated reference signal with an input signal,
a digital-to-analog converter (DAC) configured to convert an output of the comparator to provide a feedback signal, and
a switched capacitor arrangement configured to provide a difference between the photo sensing signal and the feedback signal as the input signal to the comparator for comparison with the offset-compensated reference signal.

15. The apparatus of claim 14, further comprising a counter configured to count an output of the comparator and output a digital signal.

* * * * *